US011654884B2

(12) United States Patent
Tong et al.

(10) Patent No.: US 11,654,884 B2
(45) Date of Patent: May 23, 2023

(54) CONTROL DEVICE OF VEHICLE

(71) Applicant: HONDA MOTOR CO., LTD., Tokyo (JP)

(72) Inventors: Kaiwen Tong, Tokyo (JP); Nobuyuki Aruga, Tokyo (JP); Masashi Eto, Tokyo (JP); Akio Futatsudera, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 114 days.

(21) Appl. No.: 17/404,578

(22) Filed: Aug. 17, 2021

(65) Prior Publication Data
US 2022/0055607 A1 Feb. 24, 2022

(30) Foreign Application Priority Data
Aug. 21, 2020 (JP) .............................. JP2020-139874

(51) Int. Cl.
*B60W 20/13* (2016.01)
*B60W 10/06* (2006.01)
(Continued)

(52) U.S. Cl.
CPC ............ *B60W 20/13* (2016.01); *B60W 10/06* (2013.01); *B60W 10/08* (2013.01); *B60W 20/12* (2016.01);
(Continued)

(58) Field of Classification Search
CPC ...... B60W 20/13; B60W 20/12; B60W 20/14; B60W 10/06; B60W 10/08; B60W 10/26;
(Continued)

(56) References Cited

U.S. PATENT DOCUMENTS

| 6,314,347 B1 * | 11/2001 | Kuroda | ................. B60W 20/00 701/25 |
| 2012/0143426 A1 * | 6/2012 | Yamamoto | ............. B60K 6/383 903/903 |

(Continued)

FOREIGN PATENT DOCUMENTS

| JP | 2005-160270 A | 6/2005 |
| JP | 6344429 B2 | 6/2018 |

(Continued)

OTHER PUBLICATIONS

Apr. 19, 2022, Japanese Office Action issued for related JP Application No. 2020-139874.

*Primary Examiner* — George C Jin
(74) *Attorney, Agent, or Firm* — Paratus Law Group, PLLC

(57) ABSTRACT

A control device of a vehicle includes a discharge control unit. The discharge control unit, in a case where a plurality of regenerative sections are included in a scheduled traveling route, extracts a first regenerative section on a vehicle side, a second regenerative section closest to the first regenerative section, and a dischargeable section between the first regenerative section and the second regenerative section. The discharge control unit, in a case where a predicted regenerative electric power amount in the first regenerative section is greater than a predicted discharge electric power amount in the dischargeable section, sets a section obtained by merging the first regenerative section, the second regenerative section, and the dischargeable section as a control target section, and performs the discharge control based on a remaining capacity of a power storage device and a predicted regenerative electric power amount in the control target section.

6 Claims, 9 Drawing Sheets

(51) Int. Cl.
*B60W 10/08* (2006.01)
*B60W 20/12* (2016.01)

(52) U.S. Cl.
CPC ... *B60W 2510/244* (2013.01); *B60W 2556/50* (2020.02); *B60W 2710/244* (2013.01)

(58) Field of Classification Search
CPC ....... B60W 2510/244; B60W 2556/50; B60W 2710/244; B60W 2552/20; B60W 30/18072; B60W 30/18127; B60W 50/0097; B60K 6/445
See application file for complete search history.

(56) References Cited

U.S. PATENT DOCUMENTS

| | | | |
|---|---|---|---|
| 2017/0355358 A1* | 12/2017 | Ogawa | B60W 10/00 |
| 2018/0265072 A1 | 9/2018 | Tagami et al. | |
| 2018/0312158 A1 | 11/2018 | Morimoto et al. | |
| 2019/0143958 A1* | 5/2019 | Jang | B60W 20/14 |
| | | | 701/22 |
| 2020/0298826 A1 | 9/2020 | Tagami et al. | |
| 2020/0353930 A1* | 11/2020 | Lee | B60W 10/188 |
| 2021/0402976 A1* | 12/2021 | Kim | B60L 7/20 |
| 2022/0289166 A1* | 9/2022 | Ohta | B60W 20/13 |

FOREIGN PATENT DOCUMENTS

| | | | |
|---|---|---|---|
| JP | 6436071 B2 | 12/2018 | |
| JP | 6531130 B2 | 6/2019 | |

\* cited by examiner

CONTROL DEVICE OF VEHICLE

CROSS-REFERENCE TO RELATED APPLICATION

The present application claims priority from Japanese Patent Application No. 2020-139874 filed on Aug. 21, 2020, the entire content of which is incorporated herein by reference.

TECHNICAL FIELD

The present invention relates to a control device of a vehicle.

BACKGROUND ART

In recent years, a vehicle including an electric motor (motor generator) as a drive source of a vehicle and a power storage device (battery) that supplies electric power to the electric motor, such as a hybrid electrical vehicle, has been developed. Such a vehicle can charge the power storage device by supplying electric power regenerated by the electric motor to the power storage device in association with braking of the vehicle. In addition, such a vehicle is also configured to control charge and discharge of the power storage device based on a scheduled traveling route of the vehicle.

For example, Japanese Patent No. 6344429 discloses a technique in which, in a case where a downhill satisfying a predetermined condition is included in a scheduled traveling route of a vehicle, a remaining capacity of a storage battery is set to a first remaining capacity smaller than a standard remaining capacity. In addition, Japanese Patent No. 6436071 discloses a technique in which an SOC of a high-voltage battery in a scheduled traveling route is predicted based on a prediction result of a road gradient and a vehicle speed in the scheduled traveling route of a vehicle, and in a case where it is determined that the high-voltage battery is in a saturation state based on the predicted SOC, a discharge amount of the high-voltage battery is increased so as not to cause the high-voltage battery to be in the saturation state.

However, in the related art, there is a room for improvement from a viewpoint of appropriately controlling charge and discharge of a power storage device based on a scheduled traveling route of a vehicle. For example, in the related art, in a case where there are a plurality of regenerative sections in which the electric motor can perform a regenerative operation in the scheduled traveling route of the vehicle, the electric power regenerated by the electric motor when the vehicle passes through the plurality of regenerative sections cannot be supplied to the power storage device, and the electric power cannot be effectively used. In addition, in the related art, in a case where there are a plurality of discharge sections in which the electric power of the electric storage device is supplied to the electric motor in the scheduled traveling route of the vehicle, the electric power of the power storage device that can be supplied to the electric motor when the vehicle passes through the plurality of discharge sections cannot be secured, and an output of the vehicle when passing through the plurality of discharge sections may decrease.

SUMMARY OF INVENTION

The present invention provides a control device of a vehicle capable of appropriately controlling charge and discharge of a power storage device based on a scheduled traveling route of a vehicle.

According to an aspect of the present invention, there is provided a control device of a vehicle. The vehicle includes a power storage device, and an electric motor connected to a drive wheel, driven by being supplied with electric power of the power storage device, and configured to supply regenerative electric power generated by a regenerative operation to the power storage device. The control device includes a discharge control unit configured to, in a case where a regenerative section in which the electric motor is able to perform the regenerative operation is included in a scheduled traveling route of the vehicle, perform a discharge control for discharging the electric power from the power storage device before the vehicle reaches a start point of the regenerative section based on a remaining capacity of the power storage device and a predicted regenerative electric power amount in the regenerative section. The discharge control unit is configured to, in a case where a plurality of regenerative sections are included in the scheduled traveling route, extract a first regenerative section on a vehicle side in the plurality of regenerative sections, a second regenerative section closest to the first regenerative section in a traveling direction of the vehicle in the plurality of regenerative sections, and a dischargeable section between the first regenerative section and the second regenerative section. The discharge control unit is configured to, in a case where a predicted regenerative electric power amount in the first regenerative section is greater than a predicted discharge electric power amount in the dischargeable section, set a section obtained by merging the first regenerative section, the second regenerative section, and the dischargeable section as a control target section that is regarded as one regenerative section. The discharge control unit is configured to perform the discharge control before the vehicle reaches a start point of the control target section based on the remaining capacity of the power storage device and a predicted regenerative electric power amount in the control target section.

According to an aspect of the present invention, there is provided a control device of a vehicle. The vehicle includes a power storage device, an electric motor connected to a drive wheel and driven by being supplied with electric power of the power storage device; and a generator configured to generate electric power and supply the generated electric power to the power storage device. The control device includes a charge control unit configured to, in a case where a discharge section in which the electric power of the power storage device is supplied to the electric motor is included in a scheduled traveling route of the vehicle, perform a charge control for charging the power storage device by the electric power generated by the generator before the vehicle reaches a start point of the discharge section based on a remaining capacity of the power storage device and a predicted discharge electric power amount in the discharge section. The charge control unit is configured to, in a case where a plurality of discharge sections are included in the scheduled traveling route, extract a first discharge section on a vehicle side in the plurality of discharge sections, a second discharge section closest to the first discharge section in a traveling direction of the vehicle in the plurality of discharge sections, and a chargeable section between the first discharge section and the second discharge section. The charge control unit is configured to, in a case where a predicted discharge electric power amount in the first discharge section is greater than a predicted charge electric power amount in the chargeable section, set a section obtained by merging the first discharge section, the second discharge section, and the chargeable section as a control target section that is regarded as one discharge section. The charge control unit is configured to perform the charge control before the vehicle reaches a start point of the control target section based on the remaining capacity of the power storage device and a predicted discharge electric power amount in the control target section.

According to the present invention, it is possible to appropriately control the charge and discharge of the power storage device based on the scheduled traveling route of the vehicle.

DESCRIPTION OF EMBODIMENTS

Hereinafter, an embodiment of a control device of a vehicle according to the present invention will be described in detail with reference to the drawings.

[Vehicle]

Figure 1:
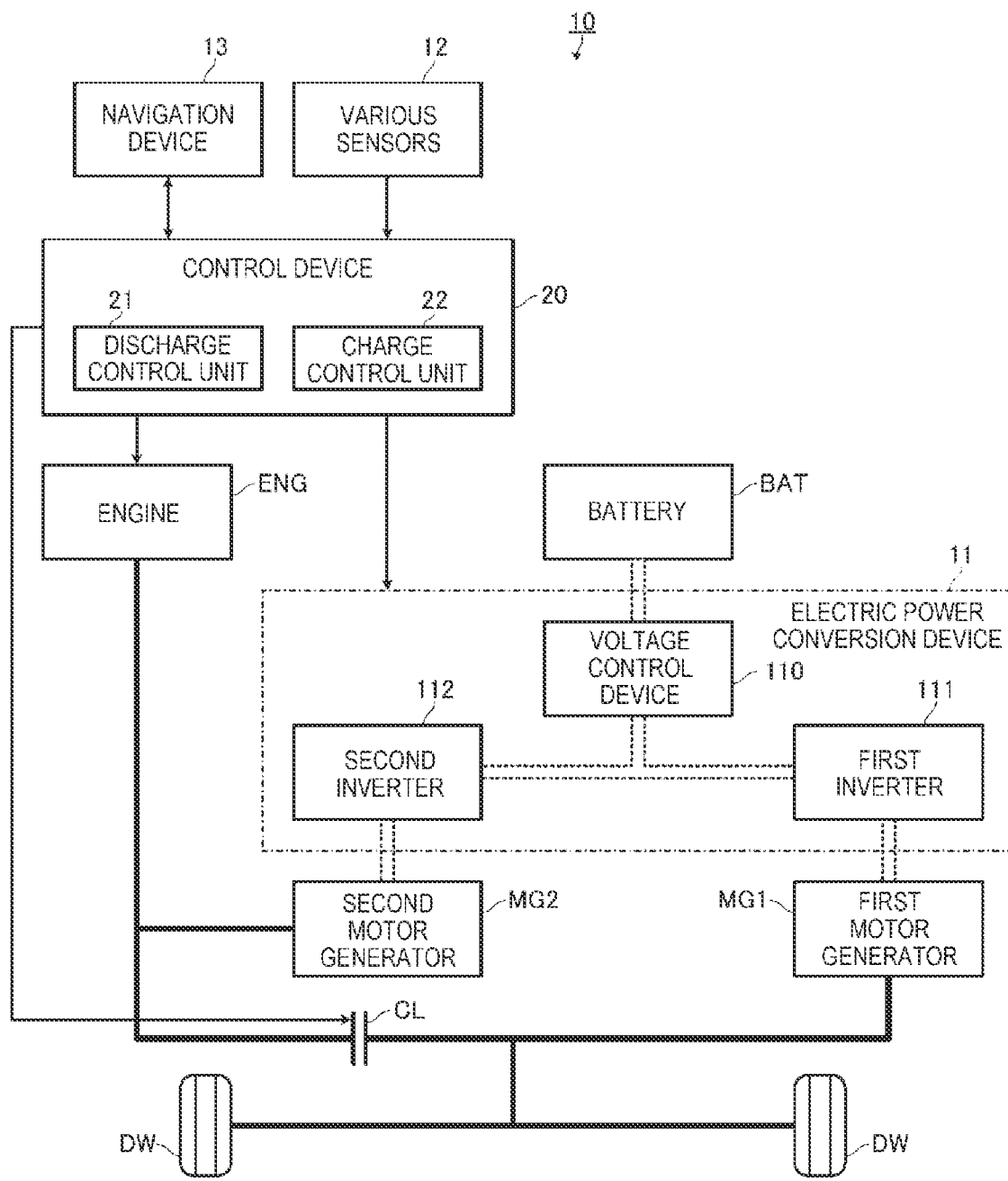
FIG. 1 is a diagram showing a schematic configuration of a vehicle according to an embodiment.

As shown in FIG. 1, a vehicle 10, which is an example of a vehicle according to the present invention, is a hybrid electrical vehicle, and includes an engine ENG, a first motor generator MG1, a second motor generator MG2, a battery BAT, a clutch CL, an electric power conversion device 11, various sensors 12, a navigation device 13, and a control device 20. In FIG. 1, thick solid lines each indicate a mechanical connection, double dotted lines each indicate an electric wiring, and thin solid line arrows each indicate a control signal or a detection signal.

The engine ENG is, for example, a gasoline engine or a diesel engine, and outputs power generated by burning supplied fuel. The engine ENG is coupled to the second motor generator MG2 and also coupled to drive wheels DW of the vehicle 10 via the clutch CL. Therefore, the power output by the engine ENG (hereinafter, also referred to as "output of the engine ENG") is transmitted to the second motor generator MG2 in a case where the clutch CL is in a disconnected state, and is transmitted to the second motor generator MG2 and the drive wheels DW in a case where the clutch CL is in a connected state (engaged state). The second motor generator MG2 and the clutch CL will be described later.

The first motor generator MG1 is, for example, an alternating current motor, and is a motor generator (so-called driving motor) mainly used as a drive source of the vehicle 10. The first motor generator MG1 is driven by being supplied with electric power, and outputs power corresponding to the electric power. In addition, the first motor generator MG1 is coupled to the drive wheels DW, and the power output from the first motor generator MG1 (hereinafter, also referred to as "output of the first motor generator MG1") is transmitted to the drive wheels DW. The vehicle 10 travels by transmitting (that is, supplying) at least one of the output of the engine ENG and the output of the first motor generator MG1 described above to the drive wheels DW.

The first motor generator MG1 is electrically connected to the battery BAT and the second motor generator MG2 via the electric power conversion device 11 to be described later, and the first motor generator MG1 can be supplied with electric power from at least one of the battery BAT and the second motor generator MG2. Although details will be described later, the battery BAT is a rechargeable and dischargeable secondary battery, and the second motor generator MG2 is a motor generator mainly used as a generator.

The first motor generator MG1 performs a regenerative operation during braking of the vehicle 10 to generate electric power (so-called regenerative power generation). Electric power generated by the regenerative operation of the first motor generator MG1 (hereinafter, also referred to as "regenerative electric power") can be supplied to the battery BAT via the electric power conversion device 11. By supplying the regenerative electric power to the battery BAT, the battery BAT can be charged with the regenerative electric power.

The regenerative electric power may be supplied to the second motor generator MG2 via the electric power conversion device 11. By supplying the regenerative electric power to the second motor generator MG2, it is possible to perform "waste electricity" in which the regenerative electric power is consumed without being supplied to the battery BAT.

Specifically, in the vehicle 10, in a case where a state of charge (SOC) of the battery BAT becomes equal to or greater than a waste electricity start SOC, the control device 20 to be described later controls the regenerative electric power so that the regenerative electric power is supplied to the second motor generator MG2 (that is, so that the waste electricity is performed). In other words, in a case where the SOC of the battery BAT is less than the waste electricity start SOC, the control device 20 controls the regenerative electric power so that the regenerative electric power is supplied to the battery BAT (that is, so that the battery BAT is charged by the regenerative electric power).

Here, the waste electricity start SOC is a predetermined threshold value as a condition for performing (starting) the waste electricity, and is set to a value (for example, 90 [%]) smaller than 100 [%], which is an SOC at the time of full charge. Accordingly, it is possible to suppress the battery BAT from being overcharged by the regenerative electric power, and therefore it is possible to suppress deterioration of the battery BAT due to an overcharged state.

At the time of waste electricity, the regenerative electric power supplied to the second motor generator MG2 is used for driving the second motor generator MG2, and the generated power is input to the engine ENG to be consumed by mechanical friction loss of the engine ENG and the like. As a specific technique for performing such waste electricity, techniques described in Japanese Patent No. 6344429 and Japanese Patent No. 6531130 can be used. A control performed by the control device 20 for performing such waste electricity is hereinafter also referred to as a "waste electricity control".

The second motor generator MG2 is, for example, an alternating current motor, and is a motor generator (so-called power generation motor) mainly used as a generator as described above. The second motor generator MG2 is driven by the power of the engine ENG to generate electric power. The electric power generated by the second motor generator MG2 is supplied to at least one of the battery BAT and the first motor generator MG1 via the electric power conversion device 11. By supplying the electric power generated by the second motor generator MG2 to the battery BAT, the battery BAT can be charged with the electric power. In addition, by supplying the electric power generated by the second motor generator MG2 to the first motor generator MG1, the first motor generator MG1 can be driven by the electric power.

The electric power conversion device 11 is a device (so-called power control unit, also referred to as "PCU") that is connected to the first motor generator MG1, the second motor generator MG2, and the battery BAT, converts an input electric power, and outputs the converted electric power. Specifically, the electric power conversion device 11 includes a first inverter 111, a second inverter 112, and a voltage control device 110. The first inverter 111, the second inverter 112, and the voltage control device 110 are electrically connected to each other.

The voltage control device 110 converts an input voltage and outputs the converted voltage. A DC/DC converter or the like can be used as the voltage control device 110. For example, in a case where the electric power of the battery BAT is supplied to the first motor generator MG1, the voltage control device 110 boosts an output voltage of the battery BAT to output the electric power to the first inverter 111. In addition, in a case where the regenerative power generation is performed by the first motor generator MG1, the voltage control device 110 steps down an output voltage of the first motor generator MG1 received via the first inverter 111 to output the electric power to the battery BAT. Further, in a case where electric power is generated by the second motor generator MG2, the voltage control device 110 steps down an output voltage of the second motor generator MG2 received via the second inverter 112 to output the electric power to the battery BAT.

In the case where the electric power of the battery BAT is supplied to the first motor generator MG1, the first inverter 111 converts the electric power (direct current) of the battery BAT received via the voltage control device 110 into an alternating current and outputs the alternating current to the first motor generator MG1. In addition, in the case where the first motor generator MG1 performs the regenerative power generation, the first inverter 111 converts the electric power (alternating current) received from the first motor generator MG1 to a direct current and outputs the direct current to the voltage control device 110. In a case where the above-described waste electricity control is performed, the first inverter 111 converts the electric power (alternating current) received from the first motor generator MG1 to a direct current and outputs the direct current to the second inverter 112.

In the case where the electric power is generated by the second motor generator MG2, the second inverter 112 converts the electric power (alternating current) received from the second motor generator MG2 into a direct current and outputs the direct current to the voltage control device 110. In addition, in the case where the above-described waste electricity control is performed, the second inverter 112 converts the regenerative electric power (direct current) of the first motor generator MG1 received via the first inverter 111 into an alternating current and outputs the alternating current to the second motor generator MG2.

The battery BAT includes a plurality of power storage cells connected in series or series-parallel, and is configured to output a high voltage of, for example, 100 [V] to 400 [V]. As the power storage cell of the battery BAT, a lithium ion battery, a nickel hydrogen battery, or the like can be used.

The clutch CL can take the connected state in which a power transmission path from the engine ENG to the drive wheel DW is connected (engaged), and the disconnected state in which the power transmission path from the engine ENG to the drive wheel DW is disconnected (blocked). The output of the engine ENG is transmitted to the drive wheel DW only when the clutch CL is in the connected state, and is not transmitted to the drive wheel DW when the clutch CL is in the disconnected state.

The various sensors 12 include, for example, a vehicle speed sensor that detects a speed of the vehicle 10 (hereinafter, also referred to as a "vehicle speed"), an accelerator position (hereinafter, also referred to as an "AP") sensor that detects an operation amount of the vehicle 10 with respect to an accelerator pedal, and a battery sensor that detects various types of information on the battery BAT (for example, the output voltage of the battery BAT, a charge and discharge current, and a temperature). Detection results of the various sensors 12 are sent to the control device 20 as detection signals.

The navigation device 13 includes a storage device (for example, a flash memory) that stores map data and the like, a global navigation satellite system (GNSS) receiver that can specify a position of the vehicle 10 (hereinafter also referred to as a "host vehicle position") based on a signal received from a positioning satellite, a display that displays various types of information, an operation button (including a touch panel) that receives an operation from a user (for example, a driver) of the vehicle 10, and the like.

The map data stored in the navigation device 13 includes road data related to a road. In the road data, each road is divided for predetermined sections, and the road data includes information on links corresponding to the respective sections and nodes connecting the links. In addition, in the road data, attribute information indicating a regulated speed (for example, a legal speed) or a gradient of a section corresponding to the link is provided in association with each link.

The navigation device 13 determines, for example, a route from the host vehicle position to a destination set by the user of the vehicle 10 (hereinafter referred to as a "guidance route") with reference to the map data or the like, and displays the determined guidance route on the display to guide the user.

The navigation device 13 predicts the scheduled traveling route of the vehicle 10 with reference to the host vehicle position, a traveling direction of the vehicle 10, the set destination, the map data, and the like. As an example, the navigation device 13 predicts a section (for example, a section from the host vehicle position to 10 [km] ahead in the traveling direction) within a predetermined range ahead of (that is, in front of) the traveling direction of the vehicle 10 from the host vehicle position as the scheduled traveling route.

When the scheduled traveling route is predicted, the navigation device 13 transmits route information on the scheduled traveling route to the control device 20. The route information includes information indicating each section included in the scheduled traveling route and the attribute information of each section. Accordingly, the navigation device 13 can notify the control device 20 of each section included in the scheduled traveling route and the regulated speed the gradient and the like of the section. In addition, the navigation device 13 also notifies the control device 20 of the host vehicle position as appropriate.

The navigation device 13 may be configured to receive road traffic information including congestion information, and may transmit the received road traffic information to the control device 20. In this way, the navigation device 13 can notify the control device 20 of a congestion situation or the like of the scheduled traveling route.

The control device 20 is an example of the control device of a vehicle of the present invention, is provided in a state of being able to communicate with the engine ENG, the clutch CL, the electric power conversion device 11 the various sensors 12, and the navigation device 13. The control device 20 controls the output of the engine ENG, controls the outputs of the first motor generator MG1 and the second motor generator MG2 by controlling the electric power conversion device 11, and controls the state of the clutch CL. Accordingly, as will be described later, the control device 20 can control a traveling mode of the vehicle 10, perform a discharge control, and perform a charge control. In addition, the control device 20 can also perform the waste electricity control as described above.

The control device 20 can be realized by, for example, an electronic control unit (ECU) including a processor that performs various calculations, a storage device that stores various types of information, an input/output device that controls input and output of data between the inside and the outside of the control device 20, and the like. The control device 20 may be realized by one ECU, or may be realized by a plurality of ECUs.

[Traveling Mode of Vehicle]

Next, the traveling mode of the vehicle 10 will be described. The vehicle 10 can take an EV traveling mode, a hybrid traveling mode, and an engine traveling mode as the traveling modes. Further, the vehicle 10 travels in any one of the traveling modes. Which traveling mode the vehicle 10 is driven in is controlled by the control device 20.

[EV Traveling Mode]

The EV traveling mode is a traveling mode in which only the electric power of the battery BAT is supplied to the first motor generator MG1 and the vehicle 10 is driven by the power output from the first motor generator MG1 in accordance with the electric power.

Specifically, in a case of the EV traveling mode, the control device 20 brings the clutch CL into the disconnected state. In addition, in the case of the EV traveling mode, the control device 20 stops the supply of the fuel to the engine ENG (performs so-called fuel cut), and stops the output of the power from the engine ENG. That is, in the EV traveling mode, power generation by the second motor generator MG2 is not performed. In the case of the EV traveling mode, the control device 20 performs a control so that only the electric power of the battery BAT is supplied to the first motor generator MG1, and the first motor generator MG1 outputs power corresponding to the electric power to drive the vehicle 10 by the power.

Even when only the electric power of the battery BAT is supplied to the first motor generator MG1, the control device 20 perform a control so that the vehicle 10 travels in the EV traveling mode on a condition that a driving force (so-called required driving force) required for the traveling of the vehicle 10 can be obtained as the power output by the first motor generator MG1 in accordance with the electric power.

In the EV traveling mode, since the supply of the fuel to the engine ENG is stopped, the fuel consumed by the engine ENG is reduced and a fuel efficiency of the vehicle 10 is improved as compared with the other traveling modes in which the fuel is supplied to the engine ENG. Therefore, it is possible to improve the fuel efficiency of the vehicle 10 by increasing a frequency (opportunity) of setting the vehicle 10 in the EV traveling mode.

In the EV traveling mode, since the second motor generator MG2 does not generate electric power, and the first motor generator MG1 is driven only by the electric power of the battery BAT, the SOC of the battery BAT tends to decrease. In other words, when the vehicle 10 travels in the EV traveling mode, the battery BAT can be quickly discharged as compared with a case where the vehicle 10 travels in another traveling mode.

[Hybrid Traveling Mode]

The hybrid traveling mode is a traveling mode in which at least the electric power of the second motor generator MG2 is supplied to the first motor generator MG1, and the vehicle 10 is mainly driven by the power output by the first motor generator MG1 in accordance with the electric power.

Specifically, in a case of the hybrid traveling mode, the control device 20 brings the clutch CL into the disconnected state. In addition, in the case of the hybrid traveling mode, the control device 20 performs a control so that the fuel is supplied to the engine ENG, and the engine ENG outputs the power to drive the second motor generator MG2 by the power of the engine ENG. Accordingly, in the hybrid traveling mode, the electric power is generated by the second motor generator MG2.

In the case of the hybrid traveling mode, the control device 20 performs a control so that the electric power generated by the second motor generator MG2 is supplied to the first motor generator MG1, and the first motor generator MG1 outputs power corresponding to the electric power. The electric power supplied from the second motor generator MG2 to the first motor generator MG1 is larger than the electric power supplied from the battery BAT to the first motor generator MG1. Therefore, in the hybrid traveling mode, as compared with the EV traveling mode, the output of the first motor generator MG1 can be increased, and a large driving force can be obtained as a driving force for causing the vehicle 10 to travel (hereinafter, also referred to as "output of the vehicle 10").

In the case of the hybrid traveling mode, the control device 20 may also cause the electric power of the battery BAT to be supplied to the first motor generator MG1 as necessary. That is, in the hybrid traveling mode, the control device 20 may cause both the electric power of the second motor generator MG2 and the electric power of the battery BAT to be supplied to the first motor generator MG1. Accordingly, as compared with the case where only the electric power of the second motor generator MG2 is supplied to the first motor generator MG1, the electric power supplied to the first motor generator MG1 can be increased, and a larger driving force can be obtained as the output of the vehicle 10.

[Engine Traveling Mode]

The engine traveling mode is a traveling mode in which the vehicle 10 is mainly driven by the power output from the engine ENG.

Specifically, in a case of the engine traveling mode, the control device 20 brings the clutch CL into the connected state. In the case of the engine traveling mode, the control device 20 performs a control so that the fuel is supplied to the engine ENG, and the power is output from the engine ENG. In the case of the engine traveling mode, since the clutch CL is in the connected state, the power of the engine ENG is transmitted to the drive wheels DW to drive the drive wheels DW. As a result, the vehicle 10 travels.

In the case of the engine traveling mode, the control device 20 may also cause the electric power of the battery BAT to be supplied to the first motor generator MG1 as necessary. Accordingly, in the engine traveling mode, the vehicle 10 can be driven using the power output from the first motor generator MG1 by the supply of the electric power of the battery BAT, and a larger driving force can be obtained as the output of the vehicle 10 as compared with the case where the vehicle 10 is driven only by the power of the engine ENG. As a result, the output of the engine ENG can be suppressed and the fuel efficiency of the vehicle 10 can be improved as compared with the case where the vehicle 10 is driven only by the power of the engine ENG.

[Control Device]

Next, the control device 20 will be described. As shown in FIG. 1, the control device 20 includes a discharge control unit 21 as a functional unit realized by a processor executing a program stored in a storage device of the control device 20.

In a case where the scheduled traveling route of the vehicle 10 includes the regenerative section in which the first motor generator MG1 can perform the regenerative operation, the discharge control unit 21 is configured to perform the discharge control for discharging the electric power from the battery BAT before the vehicle 10 reaches a start point of the regenerative section based on the remaining capacity of the battery BAT and a predicted regenerative electric power amount in the regenerative section. Here, the regenerative section is, for example, a downhill where an altitude at an end point, which is an end on a side farther from the vehicle 10, is lower than an altitude at a start point, which is an end on a side close to the vehicle 10.

In the discharge control, when the vehicle 10 is traveling in the hybrid traveling mode or the engine traveling mode, the discharge control unit 21 decreases the output of the engine ENG, and increases the output of the first motor generator MG1 by increasing the electric power supplied from the battery BAT to the first motor generator MG1. By performing such discharge control, the fuel efficiency of the vehicle 10 can be improved by reducing the fuel consumed by the engine ENG while suppressing a decrease in the output of the vehicle 10.

It is preferable that the discharge control unit 21 does not change the output of the vehicle 10 before and after the discharge control even when the output of the engine ENG and the output of the first motor generator MG1 are changed by the discharge control. In this way, the discharge control can be performed while suppressing occurrence of unnatural acceleration or sluggishness that may lead to a decrease in commercial value of the vehicle 10.

In the discharge control, the discharge control unit 21 may increase the discharge amount of the battery BAT and discharge the battery BAT by increasing the frequency at which the vehicle 10 travels in the EV traveling mode. Specifically, in this case, the discharge control unit 21 increases the EV permission electric power by the discharge control. Here, the EV permission electric power is the maximum value of the electric power (for example, the electric power per unit time) that permits the discharge from the battery BAT.

That is, by increasing the EV permission electric power, it is possible to increase the maximum value of the electric power (for example, the electric power per unit time) that can be supplied from the battery BAT to the first motor generator MG1. Therefore, the maximum value of the power that can be output by the first motor generator MG1 can be increased by the electric power of only the battery BAT. As a result, the driving force required for the traveling of the vehicle 10 is easily obtained as the power that can be output by the first motor generator MG1 by the electric power of only the battery BAT. In other words, since a condition for driving the vehicle 10 in the EV traveling mode is easily satisfied, the frequency at which the vehicle 10 travels in the EV traveling mode can be increased.

In the discharge control, the discharge control unit 21 determines a target discharge electric power amount, which is a target value to be discharged before the vehicle 10 reaches the start point of the regenerative section, based on the predicted regenerative electric power amount that can be generated in the regenerative section included in the scheduled traveling route of the vehicle 10. Here, the predicted regenerative electric power amount is a total value of the regenerative electric power that can be generated in the regenerative section when the vehicle 10 travels in the regenerative section. The predicted regenerative electric power amount can be predicted based on the gradient of the regenerative section, the vehicle speed when the vehicle travels in the regenerative section, and the like. In addition, the vehicle speed when the vehicle travels in the regenerative section can be predicted based on the regulated speed of the regenerative section, the congestion situation, and the like.

When the target discharge electric power amount is determined, the discharge control unit 21 determines, as the target discharge electric power amount, a value obtained by subtracting the remaining capacity of the battery BAT, which is a condition for performing the waste electricity control, from the total value of the remaining capacity of the battery BM at that time and the predicted regenerative electric power amount. Here, the remaining capacity of the battery BAT is an electric power amount stored in the battery BAT. The current remaining capacity of the battery BAT can be derived based on the detection signal from the battery sensor described above. In addition, the remaining capacity of the battery BAT (hereinafter, also referred to as "waste electricity start remaining capacity"), which is the condition for performing the waste electricity control, is the remaining capacity of the battery BAT when the SOC of the battery BAT becomes the above-described waste electricity start SOC. The waste electricity start remaining capacity is set in advance in the control device 20.

The discharge control unit 21 sets the target discharge electric power amount determined in this way to the target value, and performs the discharge control for discharging electric power having an amount corresponding to the target discharge electric power amount from the battery BAT before the vehicle 10 reaches the start point of the regenerative section. Accordingly, as the remaining capacity of the battery BAT when the vehicle 10 reaches the start point of the regenerative section, it is possible to set a remaining capacity so that the regenerative electric power, Which can be generated in the regenerative section, can be supplied to the battery BAT (that is, charge the battery BAT) without being wasted.

Incidentally, it is also conceivable that a plurality of regenerative sections are included in the scheduled traveling route of the vehicle 10. For example, consider a case where two regenerative sections close to each other are included in the scheduled traveling route of the vehicle 10. In such a case, if the discharge control is performed in consideration of only a first regenerative section that is on the vehicle 10 side in the two regenerative sections, the regenerative electric power that can be generated in the first regenerative section can be collected without being wasted, but a situation may occur in which the battery BAT is not discharged in time by a second regenerative section, the regenerative electric power that can be generated in the second regenerative section cannot be recovered, and the electric power is wasted. When such a situation occurs, the regenerative electric power generated in the second regenerative section cannot be effectively used.

Therefore, in the case where the plurality of regenerative sections are included in the scheduled traveling route of the vehicle 10, the discharge control unit 21 extracts the first regenerative section of the plurality of regenerative sections on the vehicle 10 side (for example, closest to the vehicle 10 in the traveling direction of the vehicle 10), the second regenerative section closest to the first regenerative section in the traveling direction of the vehicle 10 in the plurality of regenerative sections, and a dischargeable section between the first regenerative section and the second regenerative section. Here, the dischargeable section is a section different from the regenerative section, and is, for example, an uphill road having a higher altitude at the end point than the altitude at the start point, or a flat road having the same altitude at the start point and the end point.

In a case where a predicted regenerative electric power amount in the first regenerative section is greater than a predicted discharge electric power amount in the dischargeable section between the first regenerative section and the second regenerative section, the discharge control unit 21 sets a section obtained by merging the first regenerative section, the second regenerative section, and the dischargeable section between the first regenerative section and the second regenerative section as a control target section that is regarded as one regenerative section, and performs the discharge control based on the remaining capacity of the battery BAT and the predicted regenerative electric power amount in the control target section. As a result, even when the plurality of regenerative sections are included in the scheduled traveling route of the vehicle 10, the discharge control unit 21 enables the supply of the regenerative electric power that can be generated in the plurality of regenerative sections to the battery BAT without wasting the regenerative electric power (that is, charge the battery BAT), and enables effective use of the regenerative electric power.

The discharge control unit 21 sets each of the first regenerative section and the second regenerative section as a separate control target section in a case where the predicted regenerative electric power amount in the first regenerative section is equal to or less than the predicted discharge electric power amount in the dischargeable section between the first regenerative section and the second regenerative section. Further, in this case, the discharge control unit 21 performs the discharge control based on the predicted regenerative electric power amount in the first regenerative section and the discharge control based on the predicted regenerative electric power amount in the second regenerative section.

Hereinafter, specific examples of a case where the plurality of regenerative sections are merged to form one control target section and a case where each of the plurality of regenerative sections is set as the separate control target section will be described.

[Case where Plurality of Regenerative Sections are Merged to Form One Control Target Section]

Figure 2:
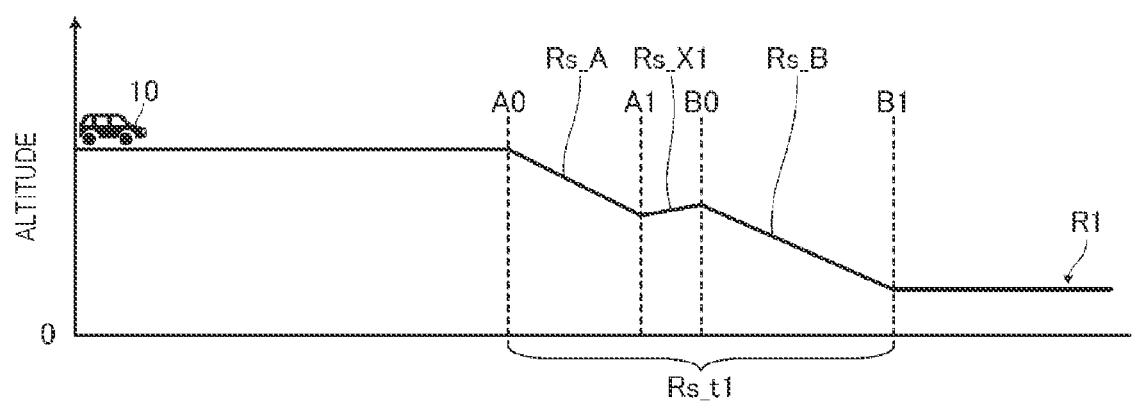
FIG. 2 is a diagram showing an example of a case where a plurality of regenerative sections are merged to form one control target section.

A first example shown in FIG. 2 is an example of a case where a plurality of regenerative sections are merged to form one control target section. In FIG. 2, it is assumed that the vehicle 10 travels from left to right. In the first example shown in FIG. 2, a scheduled traveling route R1 of the vehicle 10 includes a regenerative section Rs_A in which a start point is A0 and an end point is A1, and a regenerative section Rs_B in which a start point is B0 and an end point is B1. In addition, between the regenerative section Rs_A and the regenerative section Rs_B, there is a dischargeable section Rs_X1 in which a start point is A1 and an end point is B0.

Here, a predicted regenerative electric power amount in the regenerative section Rs_A is set to a predicted regenerative electric power amount Pg_A, and a predicted regenerative electric power amount in the regenerative section Rs_B is set to a predicted regenerative electric power amount Pg_B. In addition, the predicted discharge electric power amount in the dischargeable section Rs_X1 is set to a predicted discharge electric power amount Pd_X1. The predicted discharge electric power amount Pd_X1 is an electric power amount discharged from the battery BAT in a case where it is regarded that the vehicle 10 is traveling in the EV traveling mode in the dischargeable section Rs_X1. In other words, the predicted discharge electric power amount Pd_X1 is the electric power amount discharged from the battery BAT in a case where it is regarded that only the electric power of the battery BAT is supplied to the first motor generator MG1 and the vehicle 10 is driven only by the power output from the first motor generator MG1 in accordance with the electric power, in the dischargeable section Rs_X1. That is, the predicted discharge electric power amount Pd_X1 is the maximum electric power amount that can be discharged from the battery BAT in the dischargeable section Rs_X1.

In this way, by using the maximum electric power amount that can be discharged from the battery BAT in the dischargeable section as the predicted discharge electric power amount in the dischargeable section, even if the discharge control is performed, the remaining capacity of the battery BAT required when the vehicle 10 passes through the dischargeable section can be secured. Therefore, it is possible to suppress a decrease in the output of the vehicle 10 due to insufficient remaining capacity of the battery BAT when the vehicle 10 passes through the dischargeable section.

In the case where the scheduled traveling route R1 includes the regenerative section Rs_A, the dischargeable section Rs_X1, and the regenerative section Rs_B, the control device 20 compares a magnitude of the predicted regenerative electric power amount Pg_A of the regenerative section Rs_A with the predicted discharge electric power amount Pd_X1 of the dischargeable section Rs_X1. Here, it is assumed that |the predicted regenerative electric power amount Pg_A|>|the predicted discharge electric power amount Pd_X1|.

As described above, in a case where the magnitude of the predicted regenerative electric power amount Pg_A is greater than the magnitude of the predicted discharge electric power amount Pd_X1, the control device 20 sets the section in which the regenerative section Rs_A, the dischargeable section Rs_X1, and the regenerative section Rs_B are merged as the one control target section Rs_t1, and treats the section in which these sections are merged as one regenerative section. In this case, when the predicted regenerative electric power amount in the control target section Rs_t1 is set to the predicted regenerative electric power amount Pg_t1, the control device 20 sets the predicted regenerative electric power amount Pg_t1=the predicted regenerative electric power amount Pg_A+the predicted regenerative electric power amount Pg_B−the predicted discharge electric power amount Pd_X1. That is, the control device 20 treats the control target section Rs_t1 as one regenerative section in which the predicted regenerative electric power amount Pg_t1 is obtained.

The control device 20 determines whether the total value of the remaining capacity of the battery BAT at that time and the predicted regenerative electric power amount Pg_t1 becomes equal to or greater than the waste electricity start remaining capacity, and if the total value is equal to or greater than the waste electricity start remaining capacity, the control device 20 performs the discharge control for discharging the electric power from the battery BAT before the vehicle 10 reaches the start point A0 of the control target section Rs_t1. The target discharge electric power amount in the discharge control is a value obtained by subtracting the waste electricity start remaining capacity from the total value of the remaining capacity of the battery BAT at that time and the predicted regenerative electric power amount Pg_t1. Accordingly, the control device 20 enables the regenerative electric power generated in the control target section Rs_t1, that is, the regenerative section Rs_A and the regenerative section Rs_B, to be supplied to the battery BAT without wasting the regenerative electric power (that is, to charge the battery BAT), thereby enabling effective use of the regenerative electric power.

[Case where Each of Plurality of Regenerative Sections is Set as Separate Control Target Section]

Figure 3:
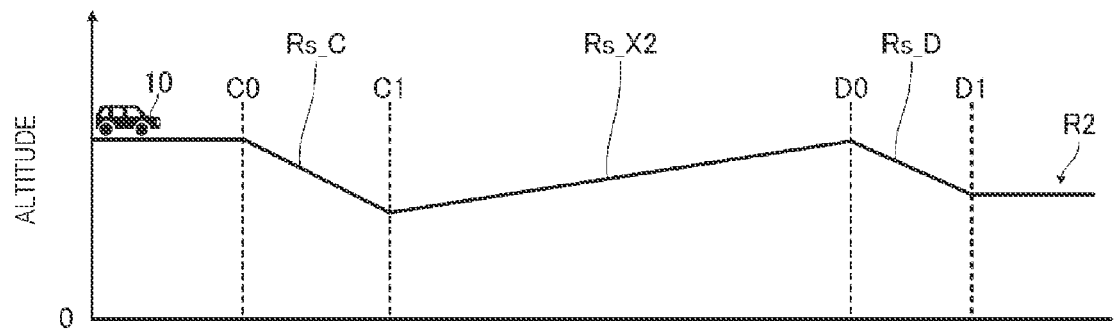
FIG. 3 is a diagram showing an example of a case where each of a plurality of regenerative sections is set as a separate control target section.

A second example shown in FIG. 3 is an example of a case where each of the plurality of regenerative sections is set as the separate control target section. In FIG. 3, it is assumed that the vehicle 10 travels from left to right. In the second example shown in FIG. 3, a scheduled traveling route R2 of the vehicle 10 includes a regenerative section Rs_C in which a start point is C0 and an end point is C1, and a regenerative section Rs_D in which a start point is D0 and an end point is D1. In addition, between the regenerative section Rs_C and the regenerative section Rs_D, there is a dischargeable section Rs_X2 in which a start point is C1 and an end point is D0.

Here, a predicted regenerative electric power amount in the regenerative section Rs_C is set to a predicted regenerative electric power amount Pg_C, and a predicted regenerative electric power amount in the regenerative section Rs_D is set to a predicted regenerative electric power amount Pg_D. In addition, the predicted discharge electric power amount in the dischargeable section Rs_X2 is set to a predicted discharge electric power amount Pd_X2. The predicted discharge electric power amount Pd_X2 is an electric power amount discharged from the battery BAT in a case where it is regarded that the vehicle 10 is traveling in the EV traveling mode in the dischargeable section Rs_X2.

In the case where the scheduled traveling route R2 includes the regenerative section Rs_C, the dischargeable section Rs_X2, and the regenerative section Rs_D, the control device 20 compares a magnitude of the predicted regenerative electric power amount Pg_C of the regenerative section Rs_C with the predicted discharge electric power amount Pd_X2 of the dischargeable section Rs_X2. Here, it is assumed that |the predicted regenerative electric power amount Pg_C|≤|the predicted discharge electric power amount Pd_X2|.

As described above, in a case where the magnitude of the predicted regenerative electric power amount Pg_C is equal to or less than the magnitude of the predicted discharge electric power amount Pd_X2, the control device 20 sets each of the regenerative section Rs_C and the regenerative section Rs_D as a separate control target section, and treats the regenerative section Rs_C and the regenerative section Rs_D as separate regenerative sections.

That is, in this case, the control device 20 determines whether a total value of the remaining capacity of the battery BAT at that time and the predicted regenerative electric power amount Pg_C is equal to or greater than the waste electricity start remaining capacity, and if the total value is equal to or greater than the waste electricity start remaining capacity, the control device 20 performs the discharge control for discharging the electric power from the battery BAT before the vehicle 10 reaches the start point C0 of the regenerative section Rs_C. The target discharge electric power amount in the discharge control is a value obtained by subtracting the waste electricity start remaining capacity from the total value of the remaining capacity of the battery BAT at that time and the predicted regenerative electric power amount Pg_C. Accordingly, the control device 20 enables the regenerative electric power generated in the regenerative section Rs_C to be supplied to the battery BAT without wasting the regenerative electric power (that is, to charge the battery BAT), thereby enabling effective use of the regenerative electric power.

When the vehicle 10 reaches the start point C0 of the regenerative section Rs_C (for example, when the vehicle 10 passes through the regenerative section Rs_C), the control device 20 then determines whether the total value of the remaining capacity of the battery BAT at that time and the predicted regenerative electric power amount Pg_D becomes equal to or greater than the waste electricity start remaining capacity, and performs the discharge control for discharging the electric power from battery BAT before the vehicle 10 reaches the start point D0 of the regenerative section Rs_D (for example, when the vehicle 10 is traveling in the dischargeable section Rs_X2) if the total value is equal to or greater than the waste electricity start remaining capacity. The target discharge electric power amount in the discharge control is a value obtained by subtracting the waste electricity start remaining capacity from the total value of the remaining capacity of the battery BAT at that time and the predicted regenerative electric power amount Pg_D. Accordingly, the control device 20 enables the regenerative electric power generated in the regenerative section Rs_D to be supplied to the battery BAT without wasting the regenerative electric power (that is, to charge the battery BAT), thereby enabling effective use of the regenerative electric power.

[Example of Discharge Control Process]

Next, an example of a discharge control process performed by the control device 20 will be described. For example, when the vehicle 10 is in a travelable state (for example, when an ignition power supply of the vehicle 10 is turned on), the control device 20 performs the discharge control process described below.

Figure 4:
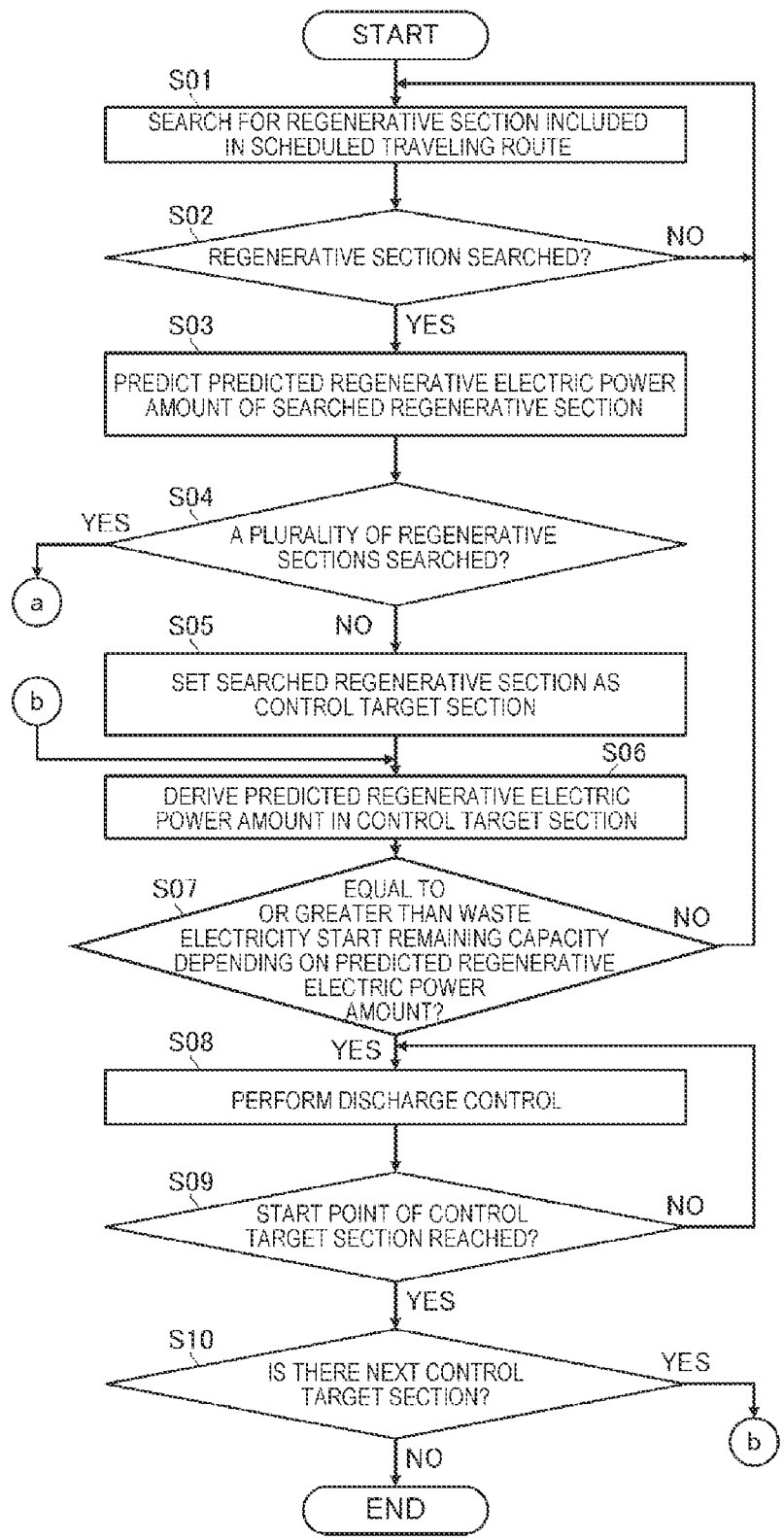
FIG. 4 is a flowchart (part 1) showing an example of a discharge control process.

As shown in FIG. 4, the control device 20 searches for the regenerative section included in the scheduled traveling route of the vehicle 10 based on the route information received from the navigation device 13 (step S01), and determines whether the regenerative section has been searched (step S02). In a case where the regenerative section is not searched (NO in step S02), that is, in a case where the scheduled traveling route of the vehicle 10 does not include the regenerative section, the control device 20 repeats the process of step S01 until the regenerative section is searched.

When the regenerative section is searched (YES in step S02), the control device 20 predicts the predicted regenerative electric power amount in the searched regenerative section (step S03). Note that a plurality of regenerative sections may be searched for by the process of step S01. In a case where the plurality of regenerative sections are searched in this way, in step S03, the control device 20 predicts the predicted regenerative electric power amount in each of the searched regenerative sections.

Next, the control device 20 determines whether the plurality of regenerative sections have been searched by the process of step S01 (step S04). If the plurality of regenerative sections have not been searched (NO in step S04), that is, if there is one searched regenerative section, the control device 20 sets the regenerative section as the control target section (step S05).

Next, the control device 20 derives the predicted regenerative electric power amount in the control target section (step S06). For example, if there is the one searched regenerative section and the regenerative section is set as the control target section, the control device 20 sets the predicted regenerative electric power amount in the regenerative section as the predicted regenerative electric power amount of the control target section as it is. On the other hand, if there are the plurality of searched regenerative sections and the section in which these sections are merged is set as the control target section, the control device 20 sets a value obtained by subtracting the predicted discharge electric power amount in the dischargeable section between the regenerative sections from the total value of the predicted regenerative electric power amounts of the plurality of regenerative sections merged as the control target section to be the predicted regenerative electric power amount of the control target section.

As described above, for example, in the case where each of the plurality of regenerative sections is set as the separate control target section, the control device 20 may set a plurality of control target sections. In a case where the plurality of control target sections are set in this way, in step S06, the control device 20 derives the predicted regenerative electric power amount of the control target section closest to the vehicle 10 in the traveling direction of the vehicle 10, in the plurality of control target sections. Hereinafter, in the description of FIG. 4, a term "control target section" refers to a control target section that is closest to the vehicle 10 in the traveling direction of the vehicle 10.

Next, the control device 20 determines whether the total value of the remaining capacity of the battery BAT at that time and the predicted regenerative electric power amount obtained by the process of step S06 is equal to or greater than the waste electricity start remaining capacity (step S07). In a case where the total value is not equal to or greater than the waste electricity start remaining capacity (NO in step S07), the control device 20 returns to the process of step S01.

In a case where the total value is equal to or greater than the waste electricity start remaining capacity (YES in step S07), the control device 20 performs the discharge control (step S08). The target discharge electric power amount in the discharge control is a value obtained by subtracting the waste electricity start remaining capacity from the total value of the remaining capacity of the battery BAT at that time and the predicted regenerative electric power amount obtained by the process of step S06.

In the discharge control, the control device 20 may calculate a required arrival time required for the vehicle 10 to reach the start point based on a distance from the host vehicle position to the start point of the control target section, the vehicle speed, or the like, and discharge the electric power with the discharge electric power amount per unit time obtained by dividing the target discharge electric power amount by the required arrival time. As a result, the control device 20 can gradually discharge the electric power from battery BAT while suppressing a large current from being discharged from the battery BAT at once, and suppressing the deterioration of the battery BAT and an unstable behavior of the vehicle 10.

The control device 20 may execute (start) the discharge control on a condition that the discharge electric power amount per unit time has become a threshold value. Accordingly, the control device 20 can perform the discharge control after the vehicle 10 sufficiently approaches the control target section.

If the discharge control is performed before the vehicle 10 sufficiently approaches the control target section, a situation may occur in which the vehicle 10 deviates from the scheduled traveling route and does not travel in the control target section (regenerative section) for some reason even though the discharge control is performed. In such a case, it is necessary to stagnate the SOC of the battery BAT without obtaining the regenerative electric power, or to drive the engine ENG and the second motor generator MG2 to charge the battery BAT again. On the other hand, as described above, by performing the discharge control after the vehicle 10 sufficiently approaches the control target section, occurrence of such a situation can be suppressed.

Next, the control device 20 determines whether the vehicle 10 has reached the start point of the control target section (step S09). In a case where it is determined that the vehicle 10 has not reached the start point of the control target section (NO in step S09), the control device 20 waits for the vehicle 10 to reach the start point of the control target section while executing the discharge control.

When the control device 20 determines that the vehicle 10 has reached the start point of the control target section (YES in step S09), the control device 20 determines whether there is a next control target section in the scheduled traveling route of the vehicle 10 (step S10). If there is the next control target section (YES in step S10), the control device 20 returns to the process of step S06, and performs the above-described process again using the control target section as an object to be processed. If there is no next control target section (NO in step S10), the control device 20 ends the process shown in FIG. 4. Upon completion of the process shown in FIG. 4, the control device 20 returns to the process of step S01 and starts the process shown in FIG. 4 again.

Figure 5:
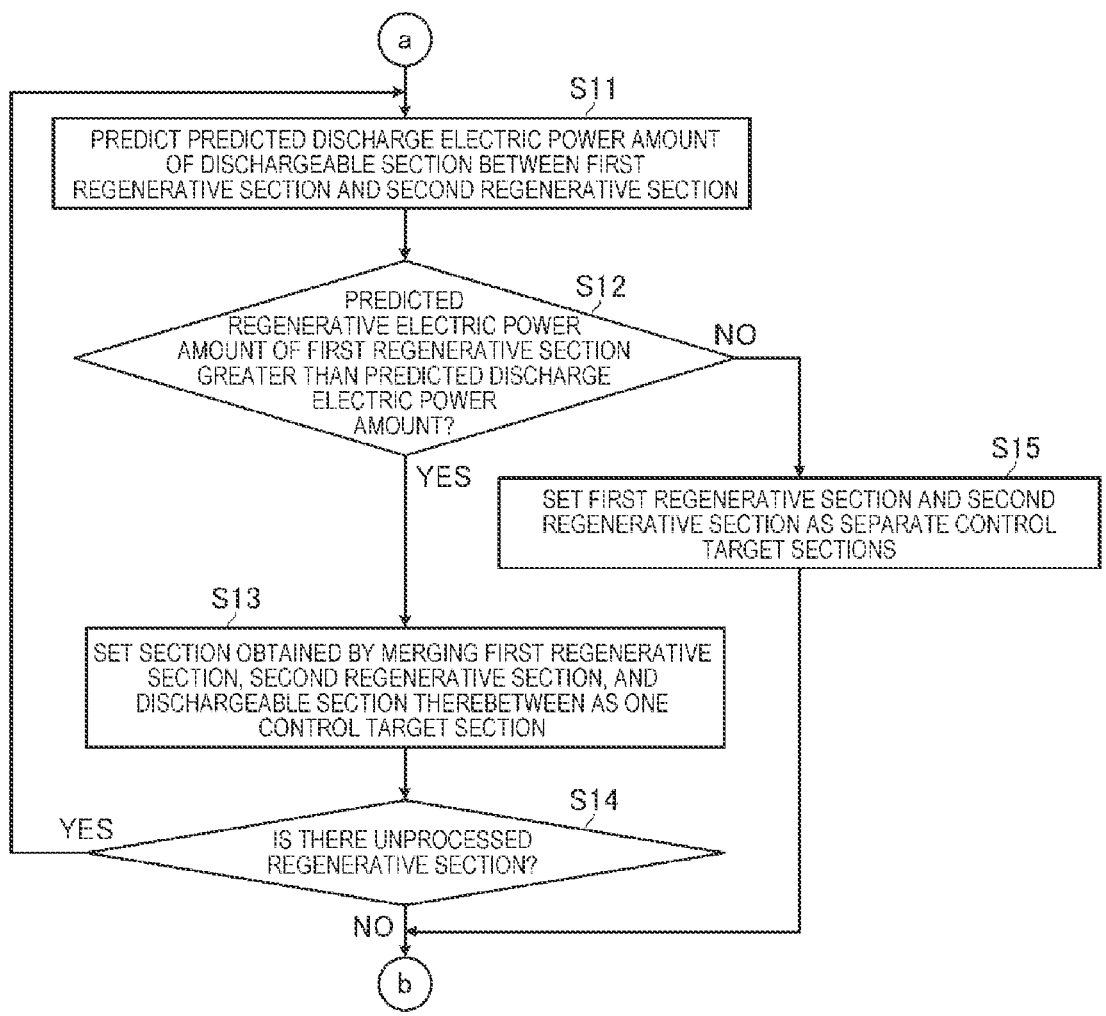
FIG. 5 is a flowchart (part 2) showing an example of the discharge control process.

When it is determined in step S04 that the plurality of regenerative sections have been searched (YES in step S04), the control device 20 proceeds to a process of step S11 shown in FIG. 5, and predicts the predicted discharge electric power amounts of the dischargeable section between the first regenerative section and the second regenerative section (step S11). As described above, here, the first regenerative section is the regenerative section closest to the vehicle 10 in the traveling direction of the vehicle 10 in the regenerative sections included in the scheduled traveling route of the vehicle 10. In addition, the second regenerative section is a regenerative section closest to the first regenerative section in the traveling direction of the vehicle 10 in the regenerative sections included in the scheduled traveling route of the vehicle 10.

The control device 20 determines whether a magnitude of the predicted regenerative electric power amount in the first regenerative section is greater than a magnitude of the predicted discharge electric power amount obtained by the process of step S11 (step S12). In a case Where the predicted regenerative electric power amount in the first regenerative section is greater than the predicted discharge electric power amount (YES in step S12), the control device 20 sets the section in which the first regenerative section, the second regenerative section, and the dischargeable section between the first regenerative section and the second regenerative section are merged as one control target section (step S13). When the section in which the first regenerative section, the second regenerative section, and the dischargeable section are merged is set as the control target section, the control device 20 subsequently treats the control target section as one regenerative section.

Next, the control device 20 determines whether there is an unprocessed regenerative section (a regenerative section that is not set as the control target section) in the regenerative sections included in the scheduled traveling route of the vehicle 10 (step S14). If there is the unprocessed regenerative section (YES in step S14), the control device 20 returns to the process of step S11 and performs the above-described process again.

If there is no unprocessed regenerative section (NO in step S14), the control device 20 proceeds to the process of step S06. In addition, in a case Where the predicted regenerative electric power amount in the first regenerative section is equal to or less than the predicted discharge electric power amount (NO in step S12), the control device 20 sets each of the first regenerative section and the second regenerative section as the separate control target section (step S14), and proceeds to the process of step S06.

As described above, according to the control device 20, even when the plurality of regenerative sections are included in the scheduled traveling route of the vehicle 10, it is possible to supply the regenerative electric power that can be generated in the plurality of regenerative sections to the battery BAT without wasting the regenerative electric power (that is, to charge the battery BAT), and it is possible to effectively utilize the regenerative electric power.

In the example described above, the example in which the control device 20 controls the discharge of the battery BAT based on the scheduled traveling route of the vehicle 10 has been described, but the present invention is not limited thereto. The control device 20 may control the charge of the battery BAT based on the scheduled traveling route of the vehicle 10.

Specifically, in this case, as shown in FIG. 1, the control device 20 includes a charge control unit 22 as a functional unit realized by the processor executing a program stored in a storage device of the control device 20.

In a case where a discharge section in which the electric power of the battery BAT is supplied to the first motor generator MG1 is included in the scheduled traveling route of the vehicle 10, the charge control unit 22 is configured to perform the charge control for charging the battery BAT before the vehicle 10 reaches a start point of the discharge section based on the remaining capacity of the battery BAT and the predicted discharge electric power amount in the discharge section. Here, the discharge section is, for example, an uphill road where an altitude at an end point, which is an end on a side farther from the vehicle 10, is higher than an altitude at a start point, which is an end on a side close to the vehicle 10. In addition, the discharge section may be a section in which congestion occurs.

In the charge control, for example, when the vehicle 10 is traveling in the hybrid traveling mode, the charge control unit 22 increases the output of the engine ENG to cause the second motor generator MG2 to generate electric power larger than the electric power consumed by the first motor generator MG1. Accordingly, it is possible to charge the battery BAT while ensuring the electric power consumed by the first motor generator MG1 and maintaining the output of the vehicle 10.

In the charge control, the charge control unit 22 determines a target charge electric power amount, which is a target value to be charged before the vehicle 10 reaches a start point of the discharge section, based on a predicted discharge electric power amount that can be discharged in the discharge section included in the scheduled traveling route of the vehicle 10. Here, the predicted discharge electric power amount is a total value of the electric power of the battery BAT that can be supplied to the first motor generator MG1 in the discharge section when the vehicle 10 travels in the discharge section. The predicted discharge electric power amount can be predicted based on a gradient of the discharge section, the vehicle speed when the vehicle travels in the discharge section, and the like. The vehicle speed when the vehicle travels in the discharge section can be predicted based on a regulated speed of the discharge section, the congestion situation, and the like. In addition, the predicted discharge electric power amount may also include electric power of the battery BAT that can be supplied to various auxiliary machines included in the vehicle 10 in the discharge section.

When determining the target charge electric power amount, the charge control unit 22 determines, as the target charge electric power amount, a value obtained by subtracting the current remaining capacity of the battery BAT from the total value of the remaining capacity of the battery BAT (hereinafter, also referred to as "assist lower limit remaining capacity"), which is a condition for enabling the electric power of the battery BAT to be supplied to the first motor generator MG1, and the predicted discharge electric power amount. The assist lower limit remaining capacity is set in advance in the control device 20.

The charge control unit 22 sets the target charge electric power amount determined in this way to the target value, and performs the charge control for charging the battery BAT with electric power having an amount corresponding to the target charge electric power amount before the vehicle 10 reaches the start point of the discharge section. As a result, the electric power of the battery BAT that can be supplied to the first motor generator MG1 in the discharge section can be secured as the remaining capacity of the battery BAT when the vehicle 10 reaches the start point of the discharge section.

It is also conceivable that a plurality of discharge sections are included in the scheduled traveling route of the vehicle 10. For example, consider a case where two discharge sections close to each other are included in the scheduled traveling route of the vehicle 10. In such a case, if the charge control is performed in consideration of only a first discharge section that is on the vehicle 10 side in the two discharge sections, the electric power of the battery BAT to be supplied to the first motor generator MG1 in the first discharge section can be secured, but a situation may occur in which the battery BAT is not charged in time by a second discharge section, the electric power of the battery BAT to be supplied to the first motor generator MG1 in the second discharge section cannot be recovered, and the output of the vehicle 10 is reduced when traveling in the second discharge section. In a case where such a situation occurs, the vehicle 10 becomes sluggish in the second discharge section, which leads to a decrease in the commercial value of the vehicle 10.

Therefore, in a case where the plurality of discharge sections are included in the scheduled traveling route of the vehicle 10, the charge control unit 22 extracts the first discharge section of the plurality of discharge sections on the vehicle 10 side (for example, closest to the vehicle 10 in the traveling direction of the vehicle 10), the second discharge section closest to the first discharge section in the traveling direction of the vehicle 10 in the plurality of discharge sections, and a chargeable section between the first discharge section and the second discharge section. Here, the chargeable section is a section different from the discharge section, and is, for example, a downhill having a higher altitude at the end point than the altitude at the start point, or a flat road having the same altitude at the start point and the end point.

In a case where a predicted discharge electric power amount in the first discharge section is greater than a predicted charge electric power amount in the chargeable section between the first discharge section and the second discharge section, the charge control unit 22 sets a section obtained by merging the first discharge section, the second discharge section, and the chargeable section between the first discharge section and the second discharge section as a control target section that is regarded as one discharge section, and performs the charge control based on the remaining capacity of the battery BAT and the predicted discharge electric power amount in the control target section. Accordingly, even when the plurality of discharge sections are included in the scheduled traveling route of the vehicle 10, the charge control unit 22 can secure the electric power of the battery BAT that can be supplied to the first motor generator MG1 in the plurality of discharge sections, and can maintain the output of the vehicle 10.

The charge control unit 22 sets each of the first discharge section and the second discharge section as a separate control target section in a case where the predicted discharge electric power amount in the first discharge section is equal to or less than the predicted charge electric power amount in the chargeable section between the first discharge section and the second discharge section. Further, in this case, the charge control unit 22 performs the charge control based on the predicted discharge electric power amount in the first discharge section and the charge control based on the predicted discharge electric power amount in the second discharge section.

Hereinafter, specific examples of a case where the plurality of discharge sections are merged to form one control target section and a case where the plurality of discharge sections are set as the separate control target section will be described.

[Case where Plurality of Discharge Sections are Merged to Form One Control Target Section]

Figure 6:
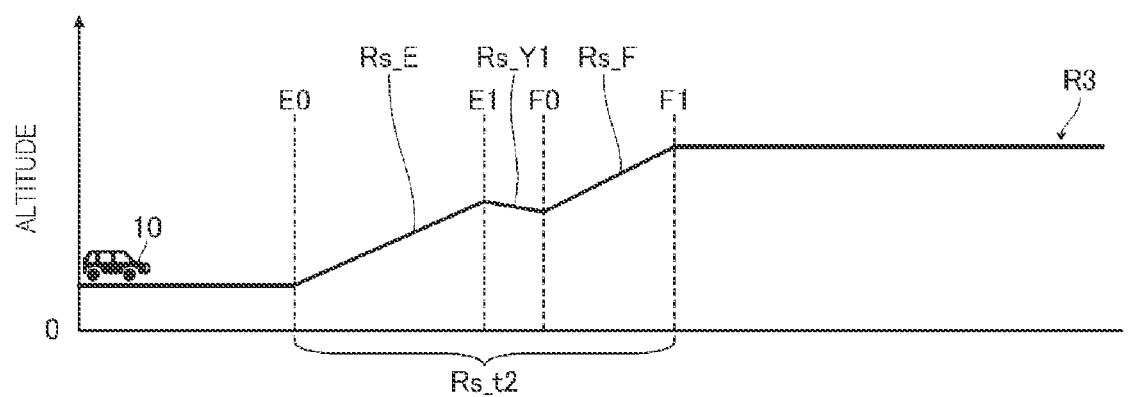
FIG. 6 is a diagram showing an example of a case where a plurality of discharge sections are merged to form one control target section.

A third example shown in FIG. 6 is an example of a case where a plurality of discharge sections are merged to form one control target section. In FIG. 6, it is assumed that the vehicle 10 travels from left to right. In the third example shown in FIG. 6, a scheduled traveling route R3 of the vehicle 10 includes a discharge section Rs_E in which a start point is E0 and an end point is E1, and a discharge section Rs_F in which a start point is F0 and an end point is F1. In addition, between the discharge section Rs_E and the discharge section Rs_F, there is a chargeable section Rs_Y1 in which a start point is E1 and an end point is F0.

Here, a predicted discharge electric power amount in the discharge section Rs_E is set to a predicted discharge electric power amount Pd_E, and a predicted discharge electric power amount in the discharge section Rs_F is set to a predicted discharge electric power amount Pd_F. In addition, the predicted charge electric power amount in the chargeable section Rs_Y1 is set to a predicted charge electric power amount Pc_Y1. The predicted charge electric power amount Pc_Y1 is an electric power amount capable of charging the battery BAT by the electric power generated by the second motor generator MG2 in a case where it is regarded that the second motor generator MG2 generates electric power by the power of the engine ENG controlled so that a rotational speed does not exceed a predetermined value, in the chargeable section Rs_Y1. Here, the predetermined value is the rotational speed of the engine ENG determined from a NV (Noise, Vibration) viewpoint.

In this way, by using the maximum predicted charge electric power amount allowed from the NV viewpoint in the chargeable section Rs_Y1 as the predicted charge electric power amount Pc_Y1, even if the charge control for charging the battery with the predicted charge electric power amount Pc_Y1 is performed in the chargeable section Rs_Y1, it is possible to suppress the decrease in the commercial value of the vehicle 10 from the NV viewpoint.

In the case where the scheduled traveling route R3 includes the discharge section Rs_E, the chargeable section Rs_Y1, and the discharge section Rs_F, the control device 20 compares the predicted discharge electric power amount Pd_E of the discharge section Rs_E with the predicted charge electric power amount Pc_Y1 of the chargeable section Rs_Y1. Here, it is assumed that |the predicted discharge electric power amount Pd_E|>|the predicted charge electric power amount Pc_Y1|.

As described above, in a case where the magnitude of the predicted discharge electric power amount Pd_E is greater than the magnitude of the predicted charge electric power amount Pc_Y1, the control device 20 sets the section in which the discharge section Rs_E, the chargeable section Rs_Y1, and the discharge section Rs_F are merged as the one control target section Rs_t2, and treats the section in which these sections are merged as one discharge section. In this case, when the predicted discharge electric power amount in the control target section Rs_t2 is set to the predicted discharge electric power amount Pd_t2, the control device 20 sets the predicted discharge electric power amount Pd_t2=the predicted discharge electric power amount Pd_E+the predicted discharge electric power amount Pd_F−the predicted charge electric power amount Pc_Y1. That is, the control device 20 treats the control target section Rs_t2 as one discharge section in which the predicted discharge electric power amount Pd_t2 is discharged.

The control device 20 determines whether a value obtained by subtracting the predicted discharge electric power amount Pd_t2 from the remaining capacity of the battery BAT at that time is equal to or less than the assist lower limit remaining capacity, and if the value is equal to or less than the assist lower limit remaining capacity, the control device 20 performs the charge control for charging the battery BAT before the vehicle 10 reaches the start point E0 of the control target section Rs_t2. The target charge electric power amount in the charge control is a value obtained by subtracting the remaining capacity of the battery BAT at that time from a total value of the assist lower limit remaining capacity and the predicted discharge electric power amount Pd_t2. Accordingly, the control device 20 can secure the electric power of the battery BAT to be supplied to the first motor generator MG1 in the control target section Rs_t2, that is, in the discharge section Rs_E and the discharge section Rs_F, and can maintain the output of the vehicle 10 when passing through the control target section Rs_t2.

[Case where Each of Plurality of Discharge Sections is Set as Separate Control Target Section]

Figure 7:
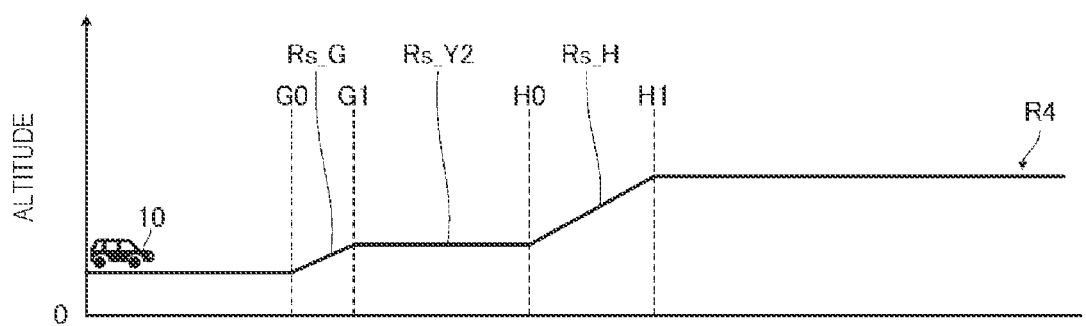
FIG. 7 is a diagram showing an example of a case where each of a plurality of discharge sections is set as a separate control target section.

A fourth example shown in FIG. 7 is an example of a case where each of the plurality of discharge sections is set as the separate control target section. In FIG. 7, it is assumed that the vehicle 10 travels from left to right. In the fourth example shown in FIG. 7, a scheduled traveling route R4 of the vehicle 10 includes a discharge section Rs_G in which a start point is G0 and an end point is G1, and a discharge section Rs_H in which a start point is H0 and an end point is H1. In addition, between the discharge section Rs_G and the discharge section Rs_H, there is a chargeable section Rs_Y2 in which a start point is G1 and an end point is H0.

Here, a predicted discharge electric power amount in the discharge section Rs_G is a predicted discharge electric power amount Pd_G, and a predicted discharge electric power amount in the discharge section Rs_H is a predicted discharge electric power amount Pd_H. In addition, the predicted charge electric power amount in the chargeable section Rs_Y2 is set to a predicted charge electric power amount Pc_Y2. The predicted charge electric power amount Pc_Y2 is the maximum predicted charge electric power amount allowed from the NV viewpoint in the chargeable section Rs_Y2.

In the case where the scheduled traveling route R4 includes the discharge section Rs_G, the chargeable section Rs_Y2, and the discharge section Rs_H, the control device 20 compares the predicted discharge electric power amount Pd_G of the discharge section Rs_G with the predicted charge electric power amount Pc_Y2 of the chargeable section Rs_Y2. Here, it is assumed that |the predicted discharge electric power amount Pd_G|≤|the predicted charge electric power amount Pc_Y2|.

As described above, in a case where the magnitude of the predicted discharge electric power amount Pd_G is equal to or less than the magnitude of the predicted charge electric power amount Pc_Y2, the control device 20 sets the discharge section Rs_G and the discharge section Rs_H as the separate control target sections, and treats these as separate discharge sections.

That is, in this case, the control device 20 first determines whether a value obtained by subtracting the predicted discharge electric power amount Pd_G from the remaining capacity of the battery BAT at that time is equal to or less than the assist lower limit remaining capacity, and if the value is equal to or less than the assist lower limit remaining capacity, the control device 20 performs the charge control for charging the battery BAT before the vehicle 10 reaches the start point G0 of the discharge section Rs_G. The target charge electric power amount in the charge control is a value obtained by subtracting the remaining capacity of the battery BAT at that time from a total value of the assist lower limit remaining capacity and the predicted discharge electric power amount Pd_G. Accordingly, the control device 20 can secure the electric power of the battery BAT to be supplied to the first motor generator MG1 in the discharge section Rs_G, and can maintain the output of the vehicle 10 when passing through the discharge section Rs_G.

When the vehicle 10 reaches the start point G0 of the discharge section Rs_G (for example, when the vehicle 10 passes through the discharge section Rs_G), the control device 20 then determines whether a value obtained by subtracting the predicted discharge electric power amount Pd_H from the remaining capacity of the battery BAT at that time becomes equal to or less than the assist lower limit remaining capacity, and perform the charge control for charging the battery BAT before the vehicle 10 reaches the start point H0 of the discharge section Rs_H (for example, when the vehicle 10 is traveling in the chargeable section Rs_Y2) if the value is equal to or less than the assist lower limit remaining capacity. The target charge electric power amount in the charge control is a value obtained by subtracting the remaining capacity of the battery BAT at that time from a total value of the assist lower limit remaining capacity and the predicted discharge electric power amount Pd_H. Accordingly, the control device 20 can secure the electric power of the battery BAT to be supplied to the first motor generator MG1 in the discharge section Rs_H, and can maintain the output of the vehicle 10 when passing through the discharge section Rs_H.

[Example of Charge Control Process]

Next, an example of a charge control process performed by the control device 20 will be described. For example, when the vehicle 10 is in the travelable state (for example, when the ignition power supply of the vehicle 10 is turned on), the control device 20 performs the charge control process described below.

Figure 8:
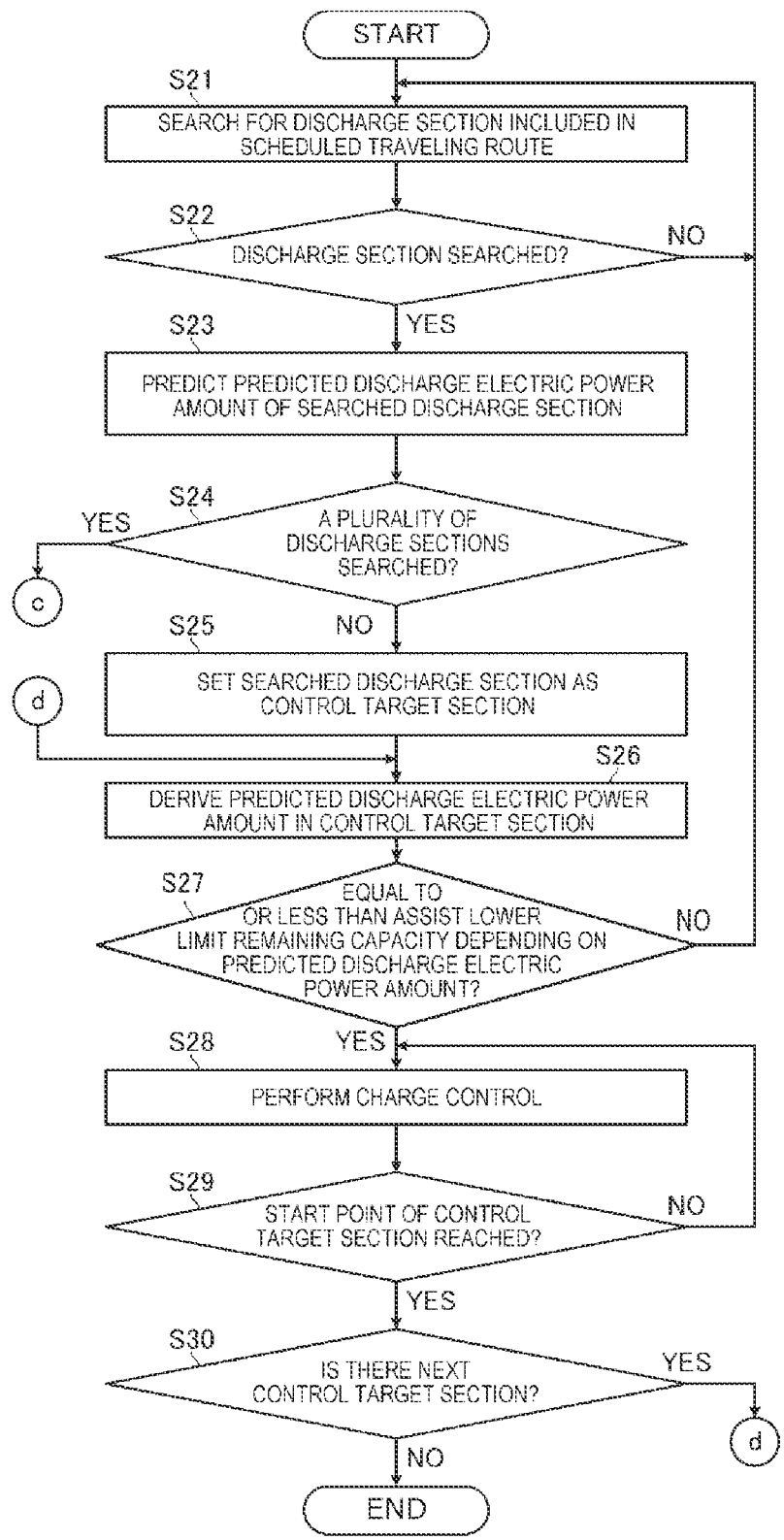
FIG. 8 is a flowchart (part 1) showing an example of a charge control process.

As shown in FIG. 8, the control device 20 searches for the discharge section included in the scheduled traveling route of the vehicle 10 based on the route information received from the navigation device 13 (step S21), and determines whether the discharge section has been searched (step S22). In a case where the discharge section is not searched (NO in step S22), that is, in a case where the scheduled traveling route of the vehicle 10 does not include the discharge section, the control device 20 repeats the process of step S21 until the discharge section is searched.

When the discharge section is searched (YES in step S22), the control device 20 predicts the predicted discharge electric power amount in the searched discharge section (step S23). Note that a plurality of discharge sections may be searched for by the process of step S21. In a case where the plurality of discharge sections are searched in this way, in step S23, the control device 20 predicts the predicted discharge electric power amount in each of the searched discharge sections.

Next, the control device 20 determines whether the plurality of discharge sections have been searched for by the process of step S21 (step S24). If the plurality of discharge sections have not been searched (NO in step S24), that is, if there is one searched discharge section, the control device 20 sets the discharge section as the control target section (step S25).

Next, the control device 20 derives the predicted discharge electric power amount of the control target section (step S26). For example, if there is the one searched discharge section and the discharge section is set as the control target section, the control device 20 sets the predicted discharge electric power amount in the discharge section as the predicted discharge electric power amount of the control target section as it is. On the other hand, if there are the plurality of searched discharge sections and the section in which the plurality of discharge sections are merged is set as the control target section, the control device 20 sets a value obtained by subtracting the predicted charge electric power amount in the chargeable section between the sections from the total value of the predicted discharge electric power amounts of the plurality of discharge sections merged as the control target section to be the predicted discharge electric power amount of the control target section.

As described above, for example, when each of the plurality of discharge sections is set as the separate control target section, the control device 20 may set a plurality of control target sections. In a case where the plurality of control target sections are set in this way, in step S26, the control device 20 derives the predicted discharge electric power amount of the control target section closest to the vehicle 10 in the traveling direction of the vehicle 10, in the plurality of control target sections. Hereinafter, in the description of FIG. 8, a term "control target section" refers to a control target section that is closest to the vehicle 10 in the traveling direction of the vehicle 10.

Next, the control device 20 determines whether the value obtained by subtracting the predicted discharge electric power amount obtained by the process of step S26 from the remaining capacity of the battery BAT at that time is equal to or less than the assist lower limit remaining capacity (step S27). In a case where the value is not equal to or less than the assist lower limit remaining capacity (NO in step S27), the control device 20 returns to the process of step S21.

In a case where the value is equal to or less than the assist lower limit remaining capacity (YES in step S27), the control device 20 performs the charge control (step S28). The target charge electric power amount in the charge control is a value obtained by subtracting the remaining capacity of the battery BAT at that time from the total value of the assist lower limit remaining capacity and the predicted discharge electric power amount obtained by the process of step S26.

In the charge control, the control device 20 may calculate a required arrival time required for the vehicle 10 to reach the start point based on the distance from the host vehicle position to the start point of the control target section, the vehicle speed, or the like, and may charge the battery BAT with the charge electric power amount per unit time obtained by dividing the target charge electric power amount by the required arrival time. As a result, the control device 20 can gradually charge the battery BAT while suppressing a large current from being supplied to the battery BAT at once, and suppressing the deterioration of the battery BAT.

The control device 20 may execute (start) the charge control on a condition that the charge electric power amount unit time has become a threshold value. Accordingly, the control device 20 can perform the charge control after the vehicle 10 sufficiently approaches the control target section.

Next, the control device 20 determines whether the vehicle 10 has reached the start point of the control target section (step S29). In a case where it is determined that the vehicle 10 has not reached the start point of the control target section (NO in step S29), the control device 20 waits for the vehicle 10 to reach the start point of the control target section while executing the charge control.

When the control device 20 determines that the vehicle 10 has reached the start point of the control target section (YES in step S29), the control device 20 determines whether there is a next control target section in the scheduled traveling route of the vehicle 10 (step S30). If there is the next control target section (YES in step S30), the control device 20 returns to the process of step S26, and performs the above-described process again using the control target section as an object to be processed. If there is no next control target section (NO in step S30), the control device 20 ends the process shown in FIG. 8. Upon completion of the process shown in FIG. 8, the control device 20 returns to the process of step S21 and starts the process shown in FIG. 8 again.

Figure 9:
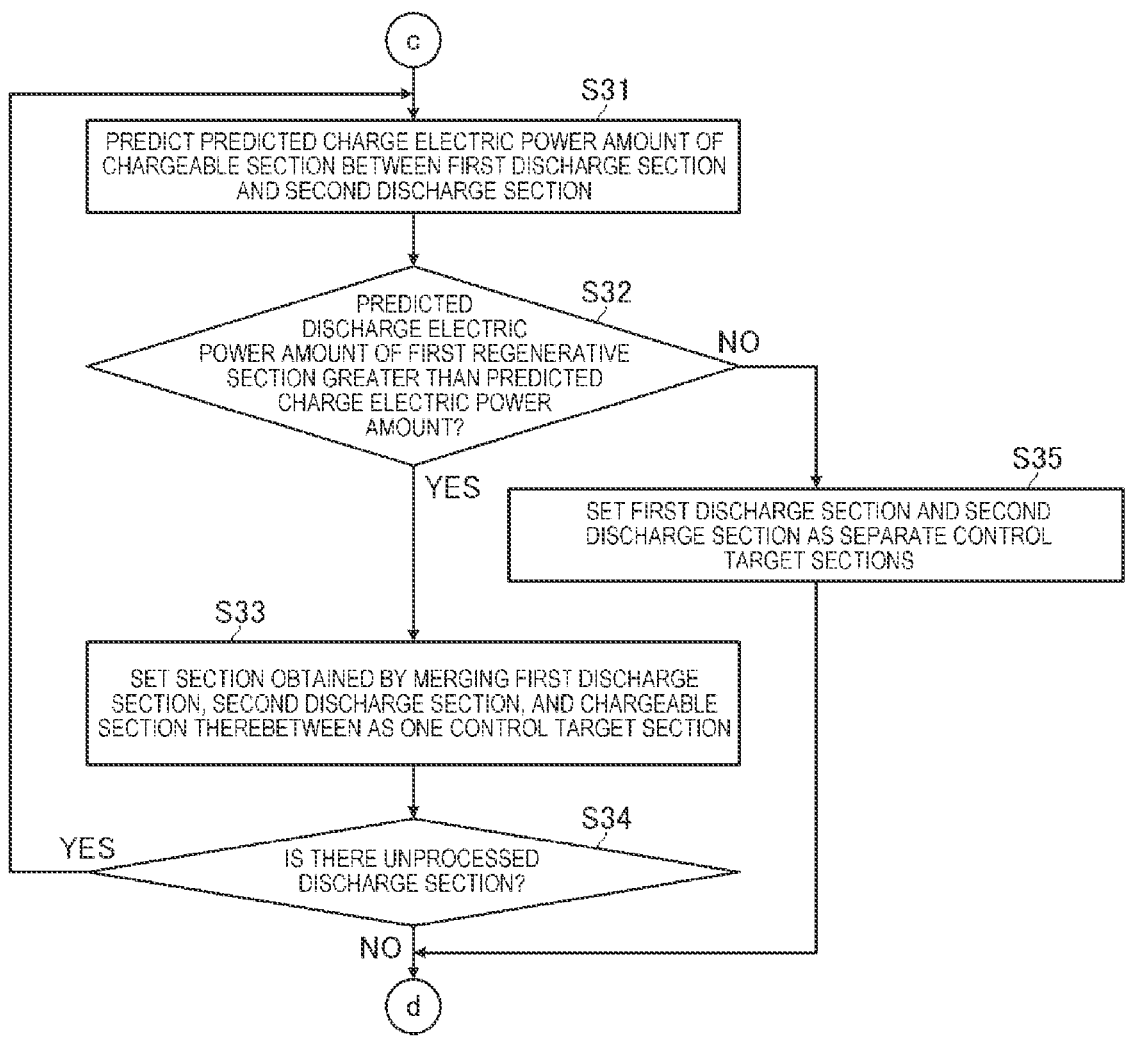
FIG. 9 is a flowchart (part 2) showing an example of the charge control process.

When it is determined in step S24 that the plurality of discharge sections have been searched (YES in step S24), the control device 20 proceeds to a process of step S31 shown in FIG. 9, and predicts the predicted charge electric power amounts of the chargeable section between the first discharge section and the second discharge section (step S31). As described above, here, the first discharge section is the discharge section closest to the vehicle 10 in the traveling direction of the vehicle 10 in the discharge sections included in the scheduled traveling route of the vehicle 10. The second discharge section is a discharge section that is closest to the first section in the traveling direction of the vehicle 10 in the discharge sections included in the scheduled traveling route of the vehicle 10.

The control device 20 determines whether a magnitude of the predicted discharge electric power amount in the first discharge section is greater than a magnitude of the predicted charge electric power amount obtained by the process of step S31 (step S32). In a case where the predicted discharge electric power amount in the first discharge section is greater than the predicted charge electric power amount (YES in step S32), the control device 20 sets the section in which the first discharge section, the second discharge section, and the chargeable section between the first discharge section and the second discharge section are merged as one control target section (step S33). When the section in which the first discharge section, the second discharge section, and the chargeable section are merged is set as the control target section, the control device 20 treats the control target section as one discharge section.

Next, the control device 20 determines whether there is an unprocessed discharge section (a discharge section that is not set as the control target section) in the discharge sections included in the scheduled traveling route of the vehicle 10 (step S34). If there is the unprocessed discharge section (YES in step S34), the control device 20 returns to the process of step S31 and performs the above-described process again.

If there is no unprocessed discharge section (NO in step S34), the control device 20 proceeds to the process of step S26. In addition, in a case where the predicted discharge electric power amount in the first discharge section is equal to or less than the predicted charge electric power amount (NO in step S32), the control device 20 sets each of the first discharge section and the second discharge section as the separate control target section (step S34), and proceeds to the process of step S26.

As described above, according to the control device 20, even when the plurality of discharge sections are included in the scheduled traveling route of the vehicle 10, it is possible to secure the electric power of the battery BAT to be supplied to the first motor generator MG1 in the plurality of discharge sections, and to maintain the output of the vehicle 10 when passing through the plurality of discharge sections.

Although the embodiment of the present invention has been described above, the present invention is not limited to the embodiment described above, and modifications, improvements, and the like can be made as appropriate.

For example, although the example in which the control device 20 includes both the discharge control unit 21 and the charge control unit 22 has been described in the embodiment described above, the present invention is not limited thereto, and only one of the discharge control unit 21 and the charge control unit 22 may be provided.

In the above-described embodiment, the navigation device 13 is provided in the vehicle 10, but the present invention is not limited thereto. The navigation device 13 may be provided so as to be communicable with the control device 20, and may be realized by a smart phone or the like that can notify the control device 20 of the scheduled traveling route of the vehicle 10 and the host vehicle position. In addition, some or all of the functions of the navigation device 13 may be realized by a server device outside the vehicle 10.

The example in which the vehicle according to the present invention is a hybrid electrical vehicle has been described in the embodiment described above, but the present invention is not limited thereto. For example, the vehicle according to the present invention may be a fuel cell vehicle. That is, the vehicle according to the present invention may be a vehicle including a generator that generates electric power using a chemical reaction of a fuel cell instead of the engine ENG and the second motor generator MG2 described above.

In the present specification, at least the following matters are described. Corresponding constituent elements or the like in the above embodiment are shown in parentheses, and the present invention is not limited thereto.

(1) A control device (control device 20) of a vehicle (vehicle 10), the vehicle including:
 a power storage device (battery BAT); and
 an electric motor (first motor generator MG1) connected to a drive wheel (drive wheel DW), driven by being supplied with electric power of the power storage device, and configured to supply regenerative electric power generated by a regenerative operation to the power storage device,
 the control device including:
 a discharge control unit (discharge control unit 21) configured to, in a case where a regenerative section (regenerative sections Rs_A, Rs_B, Rs_C, Rs_D) in which the electric motor is able to perform the regenerative operation is included in a scheduled traveling route (scheduled traveling routes R1, R2) of the vehicle, perform a discharge control for discharging the electric power from the power storage device before the vehicle reaches a start point of the regenerative section based on a remaining capacity of the power storage device and a predicted regenerative electric power amount in the regenerative section,
 wherein the discharge control unit is configured to,
  in a case where a plurality of regenerative sections (regenerative sections Rs_A, Rs_B) are included in the scheduled traveling route (scheduled traveling route R1), extract a first regenerative section (regenerative section Rs_A) on a vehicle side in the plurality of regenerative sections, a second regenerative section (regenerative section Rs_B) closest to the first regenerative section in a traveling direction of the vehicle in the plurality of regenerative sections, and a dischargeable section (dischargeable section Rs_X1) between the first regenerative section and the second regenerative section,
  in a case where a predicted regenerative electric power amount (predicted regenerative electric power amount Pg_A) in the first regenerative section is greater than a predicted discharge electric power amount (predicted discharge electric power amount Pd_X1) in the dischargeable section, set a section obtained by merging the first regenerative section, the second regenerative section, and the dischargeable section as a control target section (control target section Rs_t1) that is regarded as one regenerative section, and
  perform the discharge control before the vehicle reaches a start point of the control target section based on the remaining capacity of the power storage device and a predicted regenerative electric power amount in the control target section.

According to (1), in the case where the predicted regenerative electric power amount in the first regenerative section included in the scheduled traveling route of the vehicle is greater than the predicted discharge electric power amount in the dischargeable section between the first regenerative section and the second regenerative section closest to the first regenerative section, the section in which the first regenerative section, the second regenerative section, and the dischargeable section are merged is set as the control target section that is regarded as the one regenerative section, and the discharge control is performed before the vehicle reaches the start point of the control target section based on the predicted regenerative electric power amount in the control target section. As a result, even when the plurality of regenerative sections are included in the scheduled traveling route of the vehicle, it is possible to appropriately perform the discharge control of the power storage device based on the scheduled traveling route, it is possible to supply the regenerative electric power that can be generated in the plurality of regenerative sections to the power storage device, and it is possible to effectively use the regenerative electric power.

(2) The control device of a vehicle according to (1),
 wherein the predicted regenerative electric power amount in the control target section is a value obtained by subtracting the predicted discharge electric power amount in the dischargeable section from a total value of the predicted regenerative electric power amount in the first regenerative section and the predicted regenerative electric power amount (the predicted regenerative electric power amount Pg_B) in the second regenerative section.

According to (2), the predicted regenerative electric power amount in the control target section is the value obtained by subtracting the predicted discharge electric power amount in the dischargeable section from the total value of the predicted regenerative electric power amount in the first regenerative section and the predicted regenerative electric power amount in the second regenerative section, so that it is possible to supply the regenerative electric power that can be generated in the control target section (that is, the first regenerative section and the second regenerative section) to the power storage device, and to effectively use the regenerative electric power.

(3) The control device of a vehicle according to (1) or (2),
 wherein the predicted discharge electric power amount in the dischargeable section is an electric power amount discharged from the power storage device in a case where only the electric power of the power storage device is supplied to the electric motor, and the vehicle is driven only by power output from the electric motor in accordance with the electric power, in the dischargeable section.

According to (3), the predicted discharge electric power amount in the dischargeable section is the electric power amount discharged from the power storage device in the case where only the electric power of the power storage device is supplied to the electric motor, and the vehicle is driven only by the power output from the electric motor in accordance with the electric power, in the dischargeable section, so that even if the discharge control is performed, the remaining capacity of the power storage device required when the vehicle passes through the dischargeable section can be secured. Therefore, it is possible to suppress a decrease in the output of the vehicle due to insufficient remaining capacity of the power storage device when the vehicle passes through the dischargeable section.

(4) A control device (control device 20) of a vehicle (vehicle 10), the vehicle including:

a power storage device (battery BAT);

an electric motor (first motor generator MG1) connected to a drive wheel (drive wheel DW) and driven by being supplied with electric power of the power storage device; and a generator (second motor generator MG2) configured to generate electric power and supply the generated electric power to the power storage device, the control device including:

a charge control unit (charge control unit 22) configured to, in a case where a discharge section (discharge sections Rs_E, Rs_F, Rs_G, Rs_H) in which the electric power of the power storage device is supplied to the electric motor is included in a scheduled traveling route (scheduled traveling routes R3, R4) of the vehicle, perform a charge control for charging the power storage device by the electric power generated by the generator before the vehicle reaches a start point of the discharge section based on a remaining capacity of the power storage device and a predicted discharge electric power amount in the discharge section, wherein the charge control unit is configured to, in a case where a plurality of discharge sections (discharge sections Rs_E, Rs_F) are included in the scheduled traveling route, extract a first discharge section (discharge section Rs_E) on a vehicle side in the plurality of discharge sections, a second discharge section (discharge section Rs_F) closest to the first discharge section in a traveling direction of the vehicle in the plurality of discharge sections, and a chargeable section (chargeable section Rs_Y1) between the first discharge section and the second discharge section, in a case where a predicted discharge electric power amount (predicted discharge electric power amount Pd_E) in the first discharge section is greater than a predicted charge electric power amount (predicted charge electric power amount Pc_Y1) in the chargeable section, set a section obtained by merging the first discharge section, the second discharge section, and the chargeable section as a control target section (control target section Rs_t2) that is regarded as one discharge section, and perform the charge control before the vehicle reaches a start point of the control target section based on the remaining capacity of the power storage device and a predicted discharge electric power amount in the control target section.

According to (4), in the case where the predicted discharge electric power amount (predicted discharge electric power amount Pd_E) in the first discharge section included in the scheduled traveling route of the vehicle is greater than the predicted charge electric power amount in the chargeable section between the first discharge section and the second discharge section closest to the first discharge section, the section in which the first discharge section, the second discharge section, and the chargeable section are merged is set as the control target section that is regarded as the one discharge section, and the charge control is performed before the vehicle reaches the start point of the control target section based on the predicted discharge electric power amount in the control target section. Accordingly, even when the plurality of discharge sections are included in the scheduled traveling route of the vehicle, it is possible to appropriately perform the charge control of the power storage device based on the scheduled traveling route, it is possible to secure the electric power of the power storage device to be supplied to the electric motor in the plurality of discharge sections, and it is possible to maintain the output of the vehicle when passing through the plurality of discharge sections.

(5) The control device of a vehicle according to (4), wherein the predicted discharge electric power amount in the control target section is a value obtained by subtracting the predicted charge electric power amount in the chargeable section from a total value of the predicted discharge electric power amount in the first discharge section and the predicted discharge electric power amount (predicted discharge electric power amount Pd_F) in the second discharge section.

According to (5), the predicted discharge electric power amount in the control target section is the value obtained by subtracting the predicted charge electric power amount in the chargeable section from a total value of the predicted discharge electric power amount in the first discharge section and the predicted discharge electric power amount in the second discharge section, so that it is possible to secure the electric power of the power storage device to be supplied to the electric motor in the control target section (that is, the first discharge section and the second discharge section), and it is possible to maintain the output of the vehicle when passing through the plurality of discharge sections.

(6) The control device of a vehicle according to (4) or (5), wherein the vehicle further includes an internal combustion engine (engine ENG), wherein the generator generates electric power by being driven by power of the internal combustion engine, and wherein the predicted charge electric power amount in the chargeable section is an electric power amount capable of charging the power storage device by the electric power generated by the generator in a case where the generator generates the electric power by the power of the internal combustion engine controlled so that a rotational speed does not exceed a predetermined value, in the chargeable section.

According to (6), the predicted charge electric power amount in the chargeable section is the electric power amount capable of charging the power storage device by the electric power generated by the generator in the case where the generator generates the electric power by the power of the internal combustion engine controlled so that the rotational speed does not exceed the predetermined value, in the chargeable section, so that even if the charge control for charging the predicted charge electric power amount is performed in the chargeable section, it is possible to suppress a decrease in commercial value of the vehicle from a NV (Noise, Vibration) viewpoint.

What is claimed is:

1. A control device of a vehicle, the vehicle including:

a power storage device; and an electric motor connected to a drive wheel, driven by being supplied with electric power of the power storage device, and configured to supply regenerative electric power generated by a regenerative operation to the power storage device, the control device comprising:

a discharge control pit configured to, in a case where a regenerative section in which the electric motor is able to perform the regenerative operation is included in a scheduled traveling route of the vehicle, perform a discharge control for discharging the electric power from the power storage device before the vehicle reaches a start point of the regenerative section based on a remaining capacity of the power storage device and a predicted regenerative electric power amount in the regenerative section, wherein the discharge control unit is configured to,
in a case where a plurality of regenerative sections are included in the scheduled traveling route, extract a first regenerative section on a vehicle side in the plurality of regenerative sections, a second regenerative section closest to the first regenerative section in a traveling direction of the vehicle in the plurality of regenerative sections, and a dischargeable section between the first regenerative section and the second regenerative section,
in a case where a predicted regenerative electric power amount in the first regenerative section is greater than a predicted discharge electric power amount in the dischargeable section, set a section obtained by merging the first regenerative section, the second regenerative section, and the dischargeable section as a control target section that is regarded as one regenerative section, and
perform the discharge control before the vehicle reaches a start point of the control target section based on the remaining capacity of the power storage device and a predicted regenerative electric power amount in the control target section.

2. The control device of a vehicle according to claim 1, wherein the predicted regenerative electric power amount in the control target section is a value obtained by subtracting the predicted discharge electric power amount in the dischargeable section from a total value of the predicted regenerative electric power amount in the first regenerative section and the predicted regenerative electric power amount in the second regenerative section.

3. The control device of a vehicle according to claim 1, wherein the predicted discharge electric power amount in the dischargeable section is an electric power amount discharged from the power storage device in a case where only the electric power of the power storage device is supplied to the electric motor, and the vehicle is driven only by power output from the electric motor in accordance with the electric power, in the dischargeable section.

4. A control device of a vehicle, the vehicle including:
a power storage device;
an electric motor connected to a drive wheel and driven by being supplied with electric power of the power storage device; and
a generator configured to generate electric power and supply the generated electric power to the power storage device,
the control device comprising:
a charge control unit configured to, in a case where a discharge section in which the electric power of the power storage device is supplied to the electric motor is included in a scheduled traveling route of the vehicle, perform a charge control for charging the power storage device by the electric power generated by the generator before the vehicle reaches a start point of the discharge section based on a remaining capacity of the power storage device and a predicted discharge electric power amount in the discharge section,
wherein the charge control unit is configured to,
in a case where a plurality of discharge sections are included in the scheduled traveling route, extract a first discharge section on a vehicle side in the plurality of discharge sections, a second discharge section closest to the first discharge section in a traveling direction of the vehicle in the plurality of discharge sections, and a chargeable section between the first discharge section and the second discharge section,
in a case where a predicted discharge electric power amount in the first discharge section is greater than a predicted charge electric power amount in the chargeable section, set a section obtained by merging the first discharge section, the second discharge section, and the chargeable section as a control target section that is regarded as one discharge section, and
perform the charge control before the vehicle reaches a start point of the control target section based on the remaining capacity of the power storage device and a predicted discharge electric power amount in the control target section.

5. The control device of a vehicle according to claim 4, wherein the predicted discharge electric power amount in the control target section is a value obtained by subtracting the predicted charge electric power amount in the chargeable section from a total value of the predicted discharge electric power amount in the first discharge section and the predicted discharge electric power amount in the second discharge section.

6. The control device of a vehicle according to claim 4, wherein the vehicle further includes an internal combustion engine,
wherein the generator generates electric power by being driven by power of the internal combustion engine, and
wherein the predicted charge electric power amount in the chargeable section is an electric power amount capable of charging the power storage device by the electric power generated by the generator in a case where the generator generates the electric power by the power of the internal combustion engine controlled so that a rotational speed does not exceed a predetermined value, in the chargeable section.

* * * * *